United States Patent

Kurosawa et al.

[11] Patent Number: 6,035,059
[45] Date of Patent: Mar. 7, 2000

[54] IMAGE PROCESSING SYSTEM SUITABLE FOR COLORED CHARACTER RECOGNITION

[75] Inventors: Yoshiaki Kurosawa; Bunpei Irie, both of Kanagawa-ken; Hideo Horiuchi, Tokyo, all of Japan

[73] Assignee: Kabushiki Kaisha Toshiba, Kawasaki, Japan

[21] Appl. No.: 08/594,372

[22] Filed: Jan. 30, 1996

Related U.S. Application Data

[63] Continuation of application No. 08/220,360, Mar. 31, 1994.

[30] Foreign Application Priority Data

Mar. 31, 1993 [JP] Japan ................................. 5-074250

[51] Int. Cl.[7] .................................................. G06K 9/34
[52] U.S. Cl. ...................................... 382/164; 382/165
[58] Field of Search ................................. 382/162–165, 382/173, 175–178; 358/448, 462, 453, 464

[56] References Cited

U.S. PATENT DOCUMENTS

| | | | |
|---|---|---|---|
| 3,745,527 | 7/1973 | Yoshimura et al. | 340/146.3 B |
| 4,426,731 | 1/1984 | Edlund et al. | 382/56 |
| 4,736,441 | 4/1988 | Hirose et al. | 382/1 |
| 5,003,613 | 3/1991 | Lovelady et al. | 382/61 |
| 5,038,381 | 8/1991 | Nelson | 382/9 |
| 5,134,666 | 7/1992 | Imao et al. | 382/164 |
| 5,140,650 | 8/1992 | Casey et al. | 382/9 |
| 5,335,292 | 8/1994 | Lovelady et al. | 382/61 |
| 5,579,407 | 11/1996 | Murez | 382/164 |

FOREIGN PATENT DOCUMENTS

| | | | |
|---|---|---|---|
| 0 375 090 | 6/1990 | European Pat. Off. | G06K 9/20 |
| 2-123488 | 5/1990 | Japan | G06K 9/20 |
| 2-135584 | 5/1990 | Japan | G06K 9/20 |
| 2 203 014 | 10/1988 | United Kingdom | H04N 1/387 |

OTHER PUBLICATIONS

Yamada et al., "Segmentation and Recognition of Color–Dot Characters with Complex Background", *Systems and Computers in Japan*, vol. 21, No. 9 (1990), pp. 61–70.

*Primary Examiner*—Christopher S. Kelley
*Attorney, Agent, or Firm*—Foley & Lardner

[57] ABSTRACT

An image processing system capable of facilitating the highly accurate character recognition on the colored input images. In this system, an input image data to be processed is entered, and a color separation of the input image data is determined according to geometrical data for each image portion of the input image data, and color data for each image portion and a background of the input image data. Then, the input image data is appropriately processed according to the determined color separation. Also, in this system, at least one of color image data and gray scale image data according to the input image data are stored along with and binary image data according to the input image data, and the binary image data are processed by looking up the at least one of the color image data and the gray scale image data.

8 Claims, 12 Drawing Sheets

Y3
X3

A3

B3 c4
b4
A4
B4  C4

FIG.17
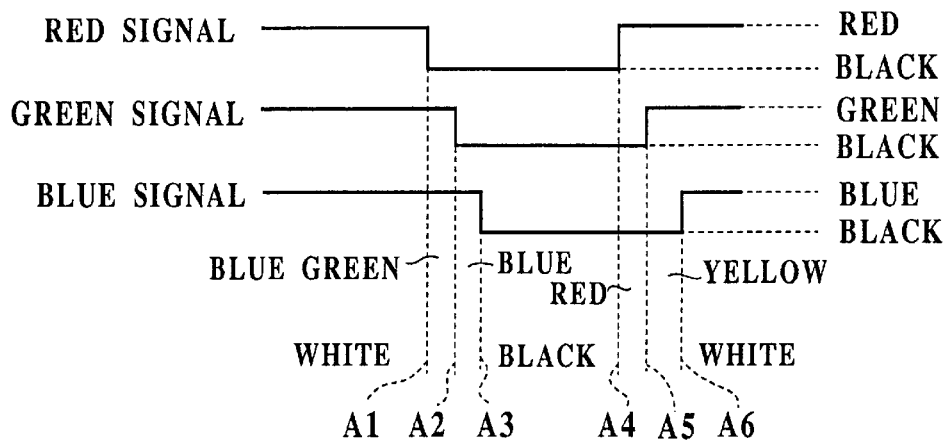
FIG.18
|   | $A_1$ | $A_2$ | $A_3$ | $A_4$ | $A_5$ | $A_6$ |
|---|---|---|---|---|---|---|
| R | $R_0$ | $R_1$ | $R_1$ | $R_1$ | $R_0$ | $R_0$ | $R_0$ |
| G | $G_0$ | $G_0$ | $G_1$ | $G_1$ | $G_1$ | $G_0$ | $G_0$ |
| B | $B_0$ | $B_0$ | $B_0$ | $B_1$ | $B_1$ | $B_1$ | $B_0$ |
FIG.19
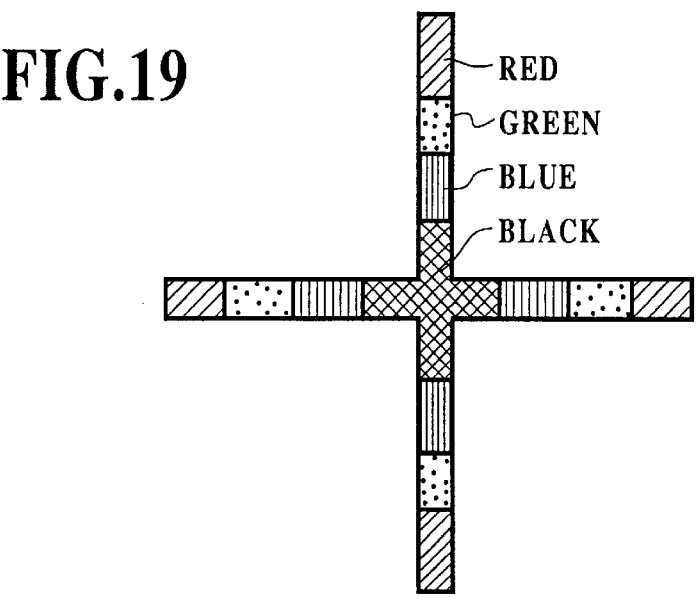

FIG.20A
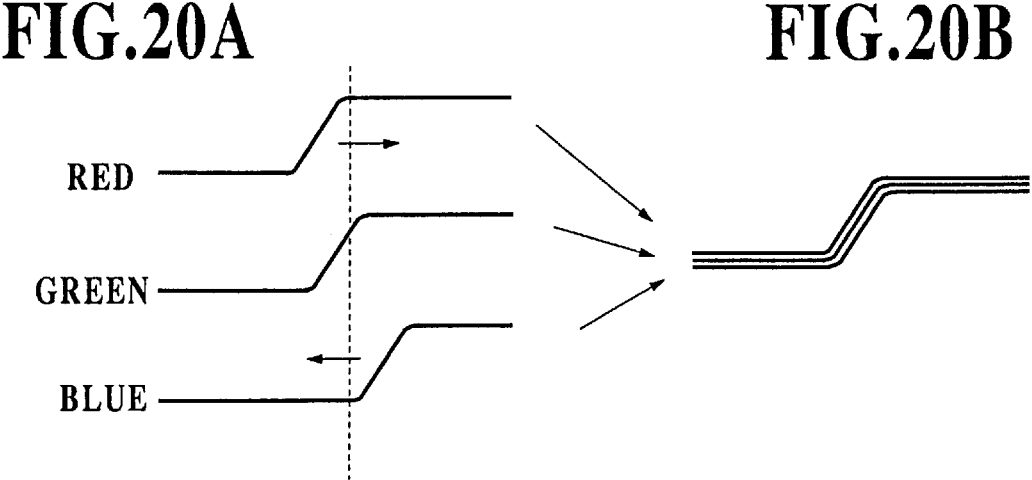
FIG.20B
FIG.21
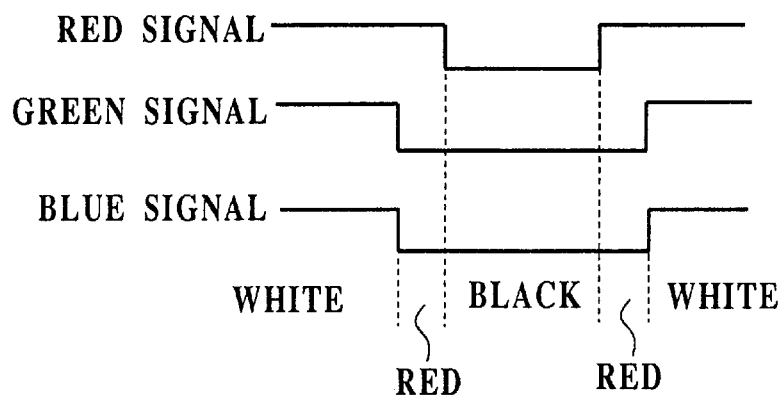
FIG.22
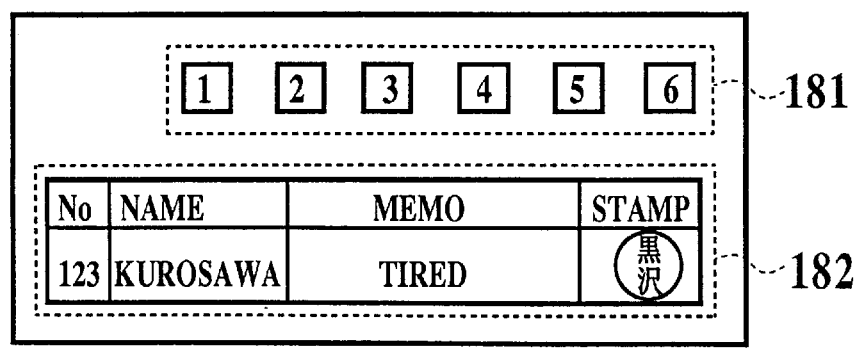

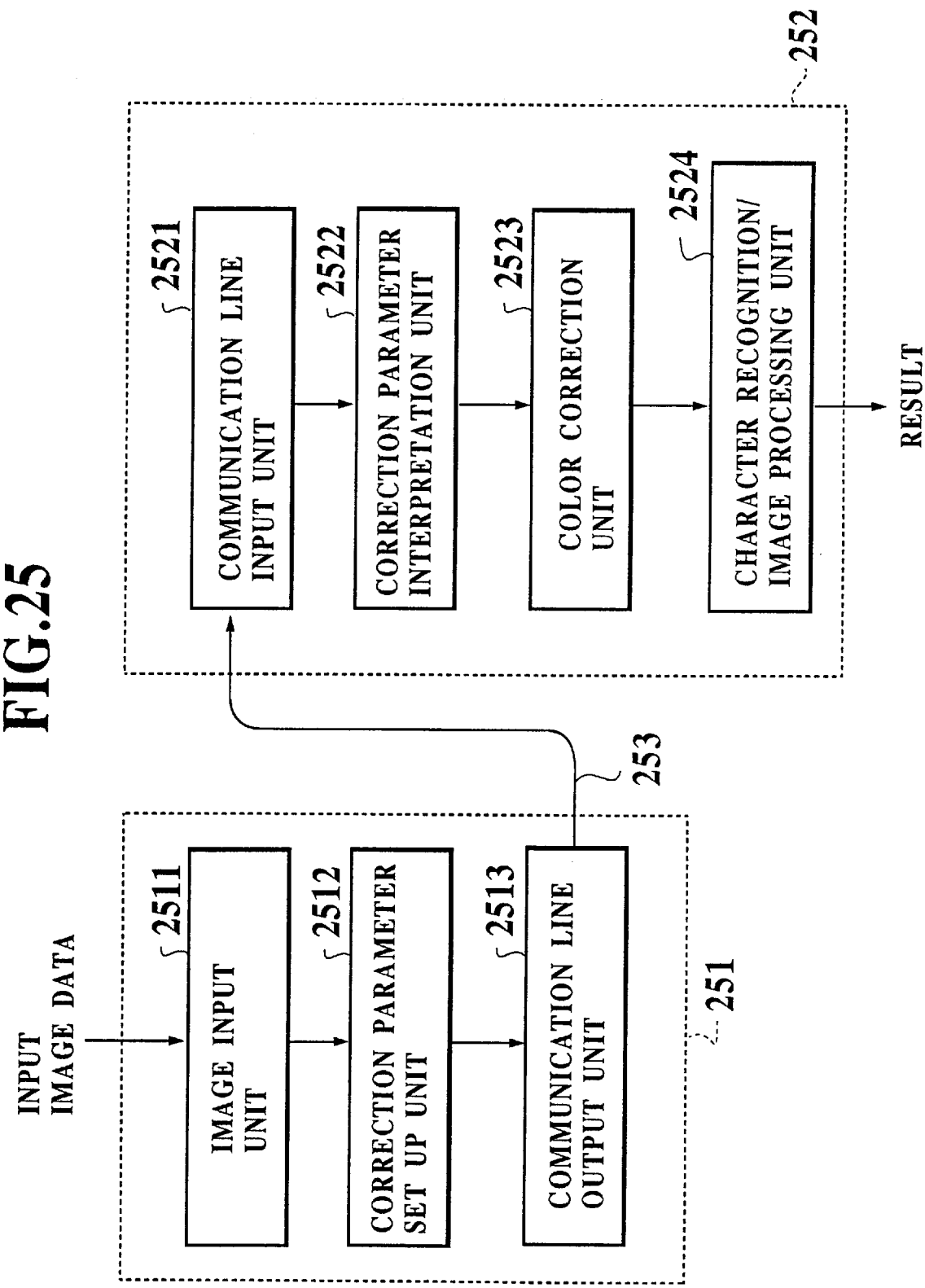

IMAGE PROCESSING SYSTEM SUITABLE FOR COLORED CHARACTER RECOGNITION

This application is a continuation of application Ser. No. 08/220,360, filed Mar. 31, 1994.

BACKGROUND OF THE INVENTION

1. Field of the Invention

The present invention relates to an image processing system suitable for character recognition of printed or handwritten characters such as those on slips.

2. Description of the Background Art

In a conventional character recognition of printed or handwritten characters on a tabular form slip in which characters are divided by ruled lines and blank spaces, at a time of image input, an optical filter treatment called drop out color is applied to remove a color constituting a form portion of the slip from the original image of the slip, so as to extract the characters to be recognized alone.

For this reason, in the conventional character recognition using the drop out color, it is impossible to deal with slips that use the form portion in colors other than those of the drop out color, or slips with a non-white background color. Moreover, it is also impossible to deal with multi-colored slips as well as the slips having characters in the color of the drop out color or in unspecified colors.

In order to resolve this problem, there has been a proposition for character recognition capable of dealing with slips by using the form portion in colors other than those of the drop out color, as disclosed in Japanese Patent Application Laid Open No. 61-15285 (1986), but this proposition relies on a technique for separating the characters from the character frames without separating the colors, so that it is only possible to realize a limited recognition level.

On the other hand, there are many propositions for character recognition which utilizes a technique of color separation for the input image. Examples of such conventional propositions includes those disclosed in Japanese Patent Application Laid Open No. 62-5485 (1987), Japanese Patent Application Laid Open No. 62-154181 (1987), Japanese Patent Application Laid Open No. 2-67689 (1990), Japanese Patent Application Laid Open No. 2-135584 (1990), Japanese Patent Application Laid Open No. 2-123488 (1990), Japanese Patent Application Laid Open No. 3-14077 (1991), Japanese Patent Application Laid Open No. 3-223987 (1991), Japanese Patent Application Laid Open No. 4-39789 (1992), Japanese Patent Application Laid Open No. 4-160486 (1992), and Japanese Patent Application Laid Open No. 4-354083 (1992).

However, in these conventional propositions, the accurate recognition of characters may not be possible when they are employed with relaxed constraints concerning the colors of the slips, the colors of the characters, the printing or handwriting method of the form portion and the characters, etc. for permitting a rough handwriting of the characters, for example. In addition, these conventional propositions have been unable to deal with a case involving color printing shear.

Furthermore, these conventional propositions merely propose the outlines for the character recognition schemes in which the color separation processing of some kind is applied to the colored input image to facilitate character recognition based on color separated image data as a replacement of character recognition using the drop out color, but fail to disclose any further detailed features necessary in constructing the practical character recognition system.

Thus, conventionally, a practically effective character recognition system not relying on the drop out color has been unavailable. For instance, there has been no practical scheme for handling a slip on which characters are printed in red over ruled lines printed in red and characters are printed in black over ruled lines printed in red are coexisting.

SUMMARY OF THE INVENTION

It is therefore an object of the present invention, to provide an image processing system capable of facilitating the highly accurate character recognition on the colored input images.

According to one aspect of the present invention there is provided an image processing system, comprising: image input means for entering an input image data to be processed; color separation means for determining a color separation of the input image data entered by the image input means, according to geometrical data for each image portion of the input image data and color data for each image portion and a background of the input image data obtained from the input image data; and image data processing means for processing the input image data according to the color separation determined by the color separation means.

According to another aspect of the present invention there is provided an image processing system, comprising: image input means for entering an input image data to be processed; buffer means for storing at least one of color image data and gray scale image data according to the input image data entered by the image input means and binary image data according to the input image data; and image data processing means for processing the binary image data stored in the buffer means by looking up said at least one of the color image data and the gray scale image data stored in the buffer means.

According to another aspect of the present invention there is provided a method of image processing, comprising the steps of: entering an input image data to be processed; determining a color separation of the input image data entered at the entering step, according to geometrical data for each image portion of the input image data, and color data for each image portion and a background of the input image data; and processing the input image data according to the color separation determined at the determining step.

According to another aspect of the present invention there is provided a method of image processing, comprising the steps of: entering an input image data to be processed; storing at least one of color image data and gray scale image data according to the input image data entered at the entering step and binary image data according to the input image data; and processing the binary image data stored at the storing step by looking up said at least one of the color image data and the gray scale image data stored at the storing step.

Other features and advantages of the present invention will become apparent from the following description taken in conjunction with the accompanying drawings.

BRIEF DESCRIPTION OF THE DRAWINGS

FIG. 17 is a diagram of one exemplary case of a color printing shear correction in the system of FIG. 1.

FIG. 18 is an illustration of a table indicating color changes in a color printing shear portion that can be used in the system of FIG. 1.

FIG. 19 is an illustration of a color printed mark that can be used in detecting a color printing shear in the system of FIG. 1.

FIGS. 20A and 20B are diagrammatic illustrations of a procedure for detecting the color printing shear in the system of FIG. 1.

FIG. 21 is a diagram of another exemplary case of a color printing shear correction in the system of FIG. 1.

FIG. 22 is an illustration of an exemplary input image that can be handled by the color separation in the system of FIG. 1.

FIG. 25 is a schematic block diagram of the second embodiment of an image processing system according to the present invention.

DETAILED DESCRIPTION OF THE PREFERRED EMBODIMENTS

Figure 1:
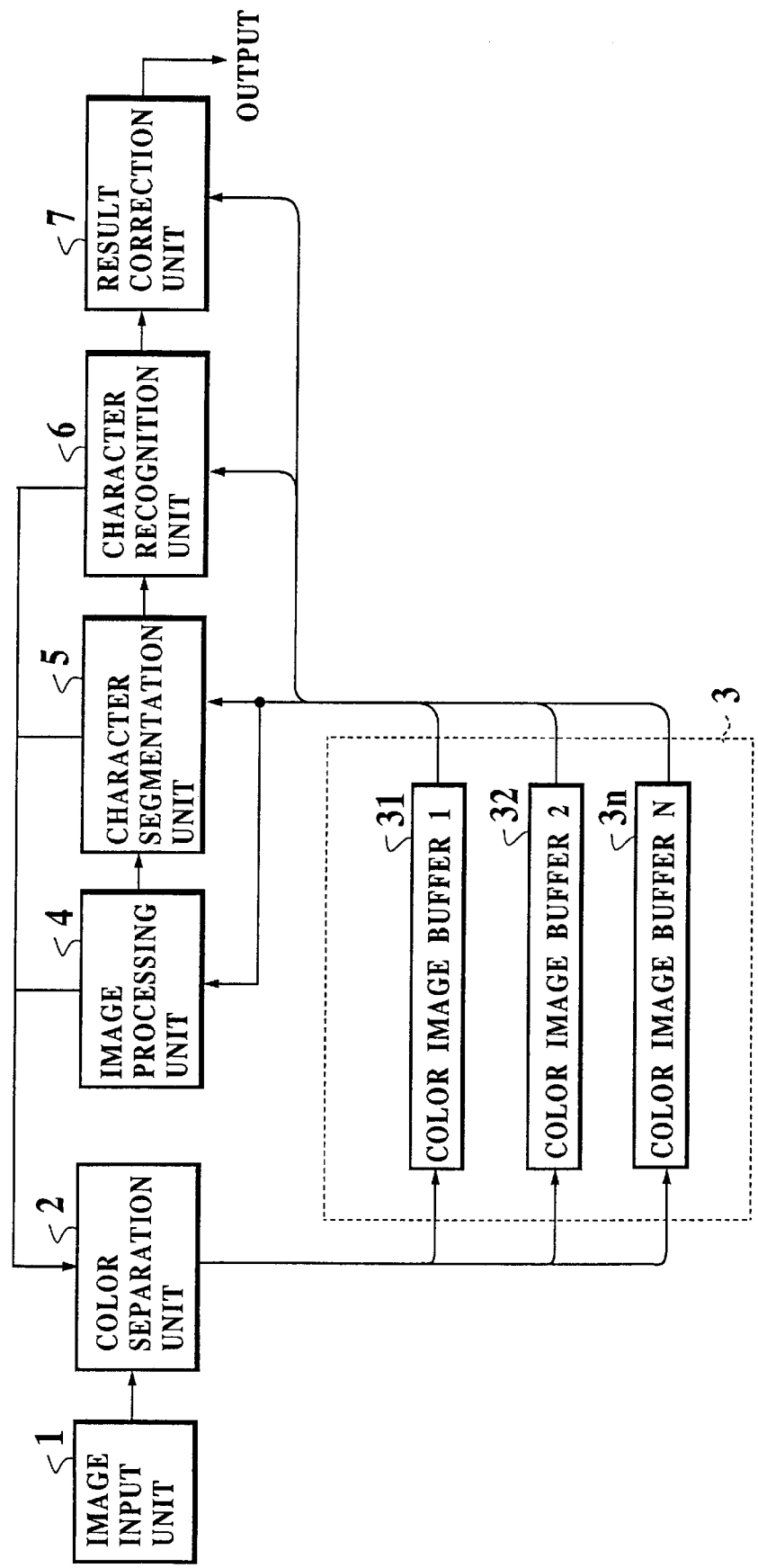
FIG. 1 is a schematic block diagram of the first embodiment of an image processing system according to the present invention.

Referring now to FIG. 1, the first embodiment of an image processing system according to the present invention will be described in detail. In the first embodiment, the image processing system is constructed in a form of the character recognition system shown in FIG. 1.

In this configuration of FIG. 1, the system comprises: an image input unit 1 for inputting colored input images; a color separation unit 2 for applying a color separation processing to separately extract color images for different colors from the color input image entered by the image input unit 1; a buffer unit 3 containing a number color image buffers 31, 32, ..., 3n for storing the color images separately extracted by the color separation unit 2; an image processing unit 4 for applying image processing such as a run length processing to be described in detail below to the color images stored in the buffer unit 3; a character segmentation unit 5 for extracting characters from the color images stored in the buffer unit 3 according to the image processing result supplied from the image processing unit 4; a character recognition unit 6 for applying a character recognition processing on the characters extracted by the character segmentation unit 5; and a result correction unit 7 for allowing an operator to correct the recognition results obtained by the character recognition unit 6 and outputting the corrected recognition results as a final output of the system.

In this first embodiment, the colored input images entered at the image input unit 1 can be given by multi-valued expressions in three colors of RGB (Red, Green, Blue) for example, although this requirement is not essential to the present invention and can be replaced by any other desired expression forms.

Now, the color separation processing at the color separation unit 2 in the configuration of FIG. 1 will be described in detail.

Namely, in the first embodiment, the color separation unit 2 carries out the following color separation processing. Here, for simplicity, an exemplary case of dealing with a gray image will be described although the same principle equally applies to any other color image.

Figure 2A:
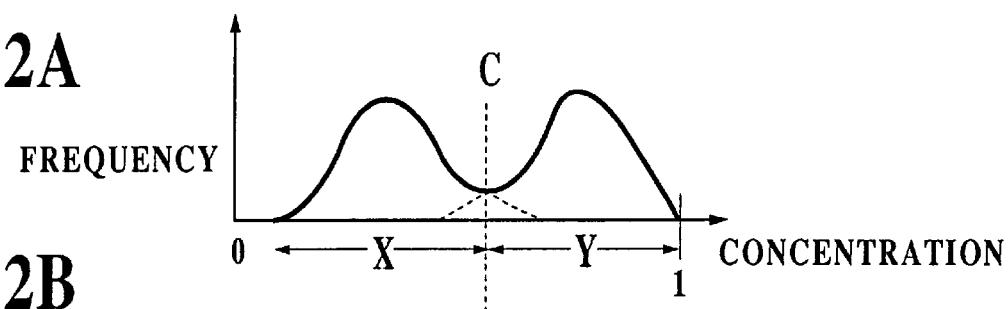
FIGS. 2A, 2B, and 2C are concentration histograms for an exemplary input image and its two parts used in a color separation in the system of FIG. 1.
Figure 2B:
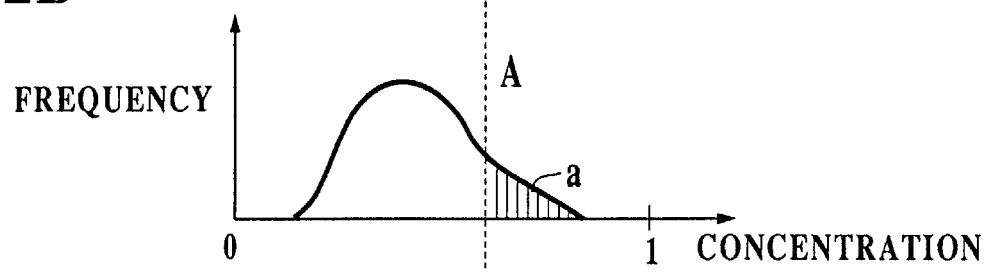
Figure 2C:
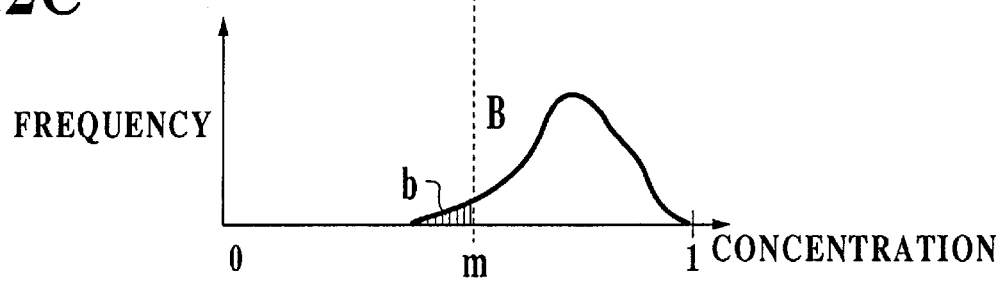
Figure 3:
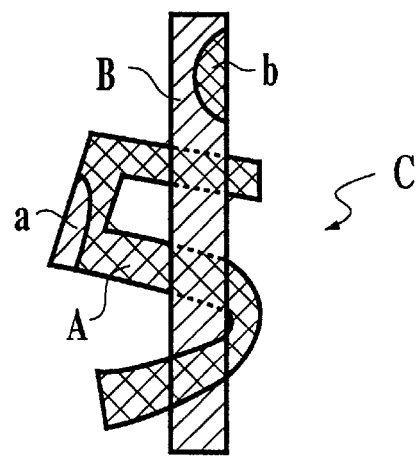
FIG. 3 is an Illustration of an exemplary input image from which the concentration histograms of FIGS. 2A, 2B, and 2C are obtained.

For an exemplary input image as shown in FIG. 3 in which a portion A representing a character "5" in dark gray color is overlapping with a portion B representing a straight line segment in light gray color, a concentration (density) histogram for an entire portion C of FIG. 3 appears as shown in FIG. 2A, while concentration histograms for the portions A and B appear as shown in FIGS. 2B and 2C, respectively. In these concentraton histograms of FIGS. 2A, 2B, and 2C, a leftmost value "0" corresponds to the black color while a rightmost value "1" corresponds to the white such that a central region corresponds to the dark to light gray colors. In the exemplary input image of FIG. 3, a part "a" of the portion A happens to be in the light gray color similar to the portion B, while a part "b" of the portion B happens to be in the dark gray color similar to the portion A. Here, the portion A is a printed or handwritten character to be recognized on the slip, while the portion B is a part of a ruled line of the slip, for example.

Figure 4A:
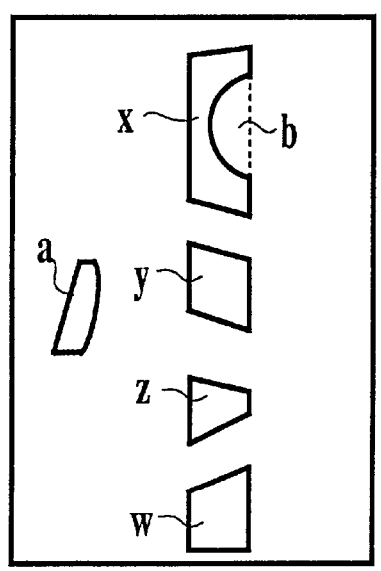
FIGS. 4A and 4B are illustrations of results of a straightforward color separation for the input image of FIG. 3.
Figure 4B:
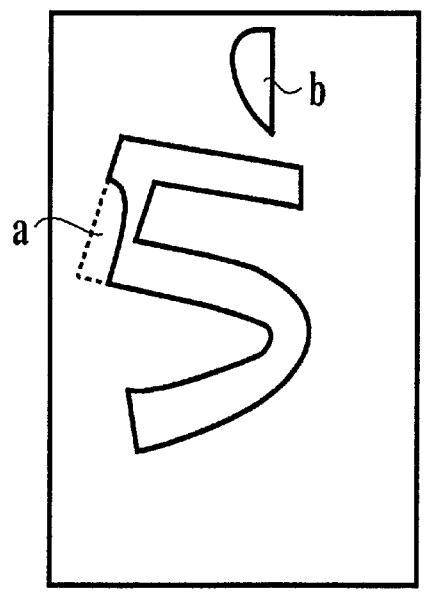

When a straightforward color separation (which is equivalent to a concentration separation in a case of the gray image in this example) is applied to the concentraton histogram of FIG. 2A, the entire portion C can be divided into two areas "X" and "Y" shown in FIGS. 4A and 4B, respectively, at a concentration level "m" as indicated in FIG. 2A. However, in this straightforward color separation, the part "a" of the portion A and the part "b" of the portion B will be noises in the portions B and A as indicated in FIGS. 4A and 4B, respectively, and the straight line segment of the portion B will be cut in pieces by the portion A as indicated in FIG. 4A, so that the accurate extraction of the character to be recognized and the ruled line to be identified becomes impossible.

In a general case of dealing with a color image given in three colors of RGB, the above described one dimensional situation will be expanded into three dimensions, such that a portion corresponding to a separable region in the three dimensional color space of RGB will be identified as one color area. In such a general case, the accurate color separation cannot be achieved by the straghtforward area divisions in the color space just as in the case of the gray image described above.

In order to remedy this situtation, the color separation unit 2 of the first embodiment utilizes a geometrical (topological) data for the picture elements constituting each portion of the input image, which specifies geometrical (topological) characteristics of each portion. As will be illustrated below, the geometrical data for each image portion of the input image data indicates a geometrical shape of each image portion, and may be given in terms of a figure type of each image portion and a geometrical feature of the figure type, where the geometrical feature specifies a quantity such as a length or a position for a feature of the geometrical shape, such as a line width for example.

Here, the geometrical (topological) data are preliminary data for the geometrical shape which facilitate the accurate color separation, and can be obtained by various feature extraction processings, such as contour extraction, thinning, etc., and recognition related processings such as ruled line extraction, stroke extraction, form structure recognition, etc., a tentative color separation processing by a straightforward color separation based on a color (concentration) level and a tentative character segmentation and recognition processings based on the tentative color separation result.

For example, the geometrical (topological) data for the picture elements constituting the portion B in FIG. 3 can specify that this portion B is a straight line segement, while the geometrical (topological) data for the picture elements constituting the portion A in FIG. 3 can specify that this portion A is a numerical character "5". Such a geometrical (topological) data can be obtained by extracting a contour of each portion by using a known figure encoding technique, and matching each contour pattern with the prescribed patterns for characters to be recognized in the system and ruled lines to be identified in the system.

More specifically, in a case of the portion B representing the straight line segment for which the straightforward color separation result is as shown in FIG. 4A, according to the geometrical (topological) data specifying that this portion B is a straight line segment, each of the separated blocks "a", "w", "x", "y", and "z" is checked to determine if it can be a part of the straight line segment or not.

Figure 5:
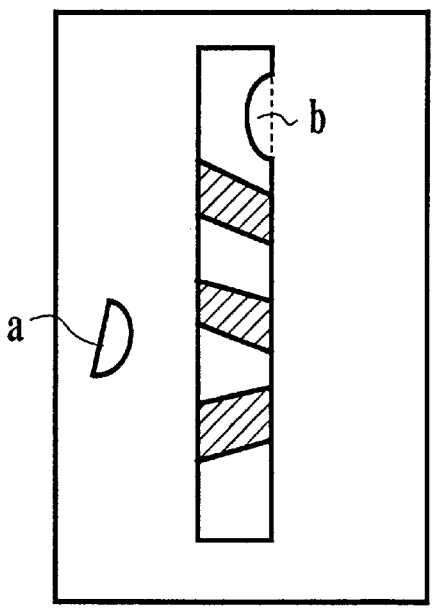
FIG. 5 is an illustration of an intermediate result of the color separation for one part of the input image of FIG. 3 after overlapped portions are supplemented.

For instance, for blocks "x" and "y", an area between these blocks "x" and "y" has a darker concentration level which implies that there is a possibility for a presence of a gray area there, so that these blocks "x" and "y" can be parts of the same straight line segment. The similar results can also be obtained for the blocks "y" and "z", and the blocks "z" and "w". In addition, the linearity of the blocks "x", "y", "z", and "w" can imply that these blocks can form a straight line segment together. Consequently, a straight line segment is formed from these blocks by extending their contour lines as indicated in FIG. 5.

On the other hand, the block "a" can be judged as non-connectable with the other blocks partly because of the inconsistencies of the extension of its contour line with the contour lines of the other blocks and also partly because of the presence of the background color in an area between this block "a" and the other blocks. As a consequence, this block "a" will be discarded as noise.

Figure 6:
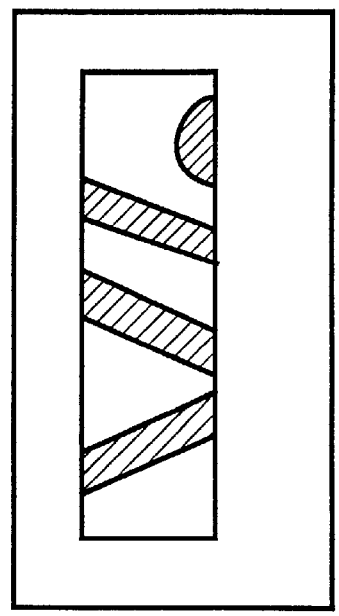
FIG. 6 is an illustration of a final result of the color separation for one part of the input image of FIG. 3 after noise portions are removed.

As for the missing part "b" which will be discovered by tracing the contour line of the block "x", the concentration level is darker than that of the block "x" but its contour line is consistent with the contour line of the straight line segment formed by the blocks "x", "y", "z", and "w", so that it can be judged as a part of the same straight line segment. As a result, a complete straight line segment as shown in FIG. 6 can be obtained eventually.

The similar color separation processing utilizing the geometrical (topological) data can also be carried out for the portion A representing the character "5", according to the geometrical (topological) data specifying the curved feature and the overall shape of this character "5".

Thus, in the color separation unit 2 of the first embodiment, a tentative color separation processing by a straightforward color separation based on a color (concentration) level is combined with various processings carried out by the image processing unit 4, the character segmentation unit 5, and the character recognition unit 6, such as tentative character segmentation and recognition processings based on the tentative color separation result, a line segment extraction processing, a form structure recognition processing, etc., in such a manner that whenever an intermediate result obtained by each processing indicates a doubtful color separation, a feedback is provided to retry the color separation according to the intermediate result as indicated by the feedback lines in FIG. 1.

For example, the feedback can be provided when the similarity level of the recognition result is low, or the least square error for the linearity is large, or an unnecessary black picture element region is attached to the extracted ruled line, or end points of two ruled lines are connectable with each other, etc.

Here, it is to be noted that the color separation unit 2 may be equipped with functions to carry out these various processings within itself independently from the image processing unit 4, character segmentation unit 5, and character recognition unit 6 of the system, if desired, in which case the feedback lines in FIG. 1 are unnecessary.

By utilizing the color separation unit 2, when a certain portion is judged as a form portion of the slip as it contains many straight lines and possibly also because of the arrangement of these straight lines, the color of these straight lines can be determined as the color of the form portion of the slip automatically. Similarly. when a certain portion is judged as containing a series of blocks in sizes of the characters to be recognized, the color of these blocks can be determined as the color of the printed or handwritten characters automatically. In this manner, the colors in the input image of the slip can be analyzed and separated automatically, without registering the color information and the form information concerning the slip in advance as the form data. Here, however, the form data of this kind may be registered in advance in order to simplify the operation in this regard.

Figure 7:
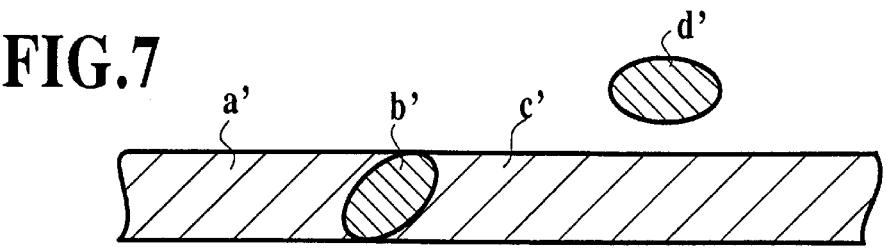
FIG. 7 is an illustration of another exemplary input image for which the color separation in the system of FIG. 1 works effectively.

For another example shown in FIG. 7, the color separation unit 2 operates as follows. In FIG. 7, a straight line segment including regions a', b', and c' has a noise region d' in its vicinity, where the regions a' and c' are in a color C1 while the regions b' and d' are in a color C2 which is an intermediate color between the color C1 and the background color.

In this case, these four regions a', b', c', and d' can be extracted by the so called region growth scheme which is one of the region segmentation methods known in the field of image processing, in which each extraction region is obtained by sequentially expanding a picture element at an arbitrary starting point by sequentially including all those picture elements which are connected with the picture elements already included in this extraction region and regarded as having the same color as that of the picture elements already included in this extraction region. It is also possible to utilize other known region segmentation schemes, such as a split and merge scheme or a relaxation scheme.

Then, as in the previous example of FIG. 3 described above, according to the geometrical (topological) data specifying a straight line segment and the judgement of the linearity of the regions a', b', and c', the region b' is separated as a part of the straight line segment in the color C1 together with the regions a' and c', while the region d' is separated as noise in the color C2.

Thus, generally speaking, in the color separation unit 2 of the first embodiment, a region segmentation is carried out and a color of each segmented region is determined first, and then a representative color of each region to be extracted as a single region is determined according to the information on each segmented region. Then, the color separation based on the determined representative color can also be carried out according to the need.

It is also possible to realize accurate color separation by introducing information concerning the closeness of the colors in conjunction with the region segmentation. For instance, by relaxing a requirement for judging the regions of the same color in the above example of FIG. 7, the regions a', b', and c' can be extracted as a single region at once by executing the region growth scheme. Namely, in the course of the region growth scheme, if the color C1 and the color C2 can be judged as close to each other, the region a' and c' in the color C1 and the region b' in the color C2 having contours which are largely in contact with each other can be merged to form one large region and extracted together as a single straight line segment correctly. In this case, the region d' in the color C2 can still be discarded as noise because of the absence of another region having the color close to the color C2 and the contour largely in contact with that of the region d', since the region d' is surrounded by the background color.

Thus, in the color separation unit 2 of the first embodiment, because of the use of geometrical (topological) data, the determination of the representative color and the color separation can be realized at an improved accuracy compared with a conventional scheme solely relying on the statistical information of the colors, such as the color histogram.

Figure 8A:
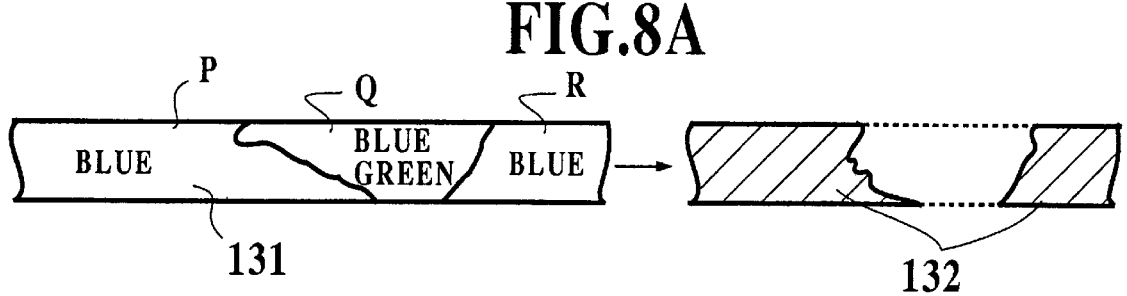
FIGS. 8A and 8B are illustrations of further exemplary input images for which the color separation in the system of FIG. 1 works effectively.
Figure 8B:
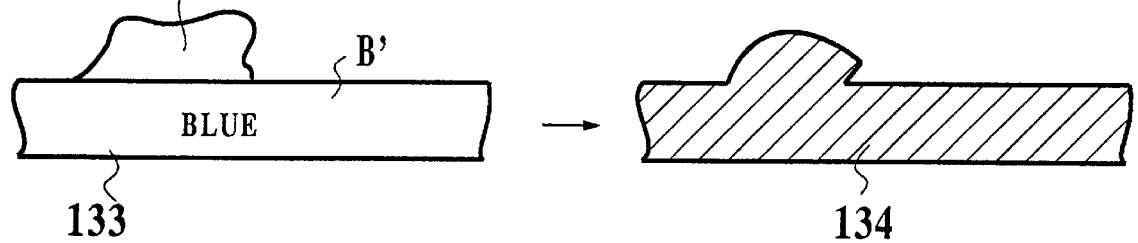

In addition, in a case of separating and extracting a region in a particular color, it is effective to utilize the shape data for the figure, lines, curves, or characters to be recognized in conjunction with the color data. Namely, for another example shown in FIG. 8A in which a straight line segment 131 in blue including regions P and R in blue as well as a region Q in blue green, if the blue colored regions P and R alone are extracted from this straight line segment 131 straightforwardly, the extracted region 132 becomes a broken straight line segment as indicated in FIG. 8A. However, a simple-minded solution to regard the blue green as sufficiently close to the blue as to be extracted together is going to cause a problem in another situtation as shown in FIG. 8B in which a straight line segment 133 in blue has noise A' in blue green attached to a straight line portion B' such that an extracted region 134 is going to include the noise A' together with the straight line portion B' according to the simple-minded solution as indicated in FIG. 8B.

In such a case, the color separation unit 2 of the first embodiment carries out shape analysis of the blue region first according to the geometrical (topological) data for the straight line segment 131, and separates all of the regions P, Q, and R together as the blue region according to the judgement concerning the closeness of the colors of these regions and the linearity of the shapes of these regions. In this manner, the straight line segment alone can be separated and extracted correctly in both cases of FIGS. 8A and 8B.

Figure 9:
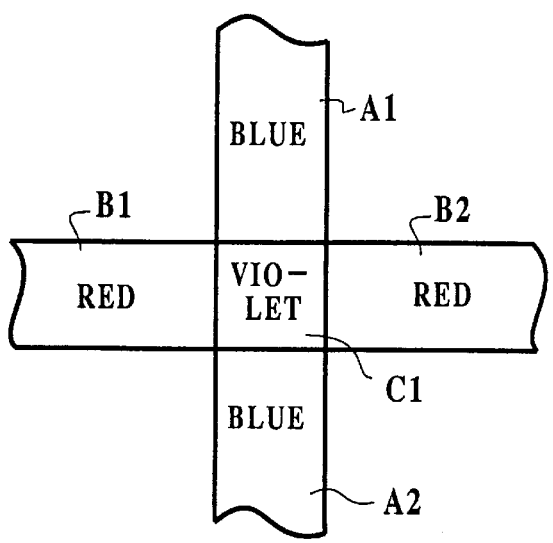
FIG. 9 is an illustration of still another exemplary input image for which the color separation in the system of FIG. 1 works effectively.

In a similar manner, for another example shown in FIG. 9, the color separation unit 2 operates as follows. In FIG. 9, a blue line and a red line are overlapping, such that the blue line which includes regions A1, C1, and A2, and the red line which includes regions B1, C1, and B2, are sharing an overlapping region C1 in violet resulting from the mixture of the red and the blue.

In this case, if the red colored region alone or the blue colored region alone is extracted straightforwardly, the overlapping region C1 cannot be extracted. Also, a simple-minded solution to extract the violet colored region along with the red colored region is unacceptable as the truly violet colored region is also going to be extracted along with the red colored region erroneously.

In such a case, the color separation unit 2 of the first embodiment operates as follows. First, in order to extract the blue colored region, the color analysis of the areas in contact with the blue areas is carried out to check if there is a mixed color area having a mixed color which can be obtained by mixing the blue with another base color or not. If such a mixed color area exists, a vicinity of such a mixed color area is checked to determine if there is another base color area having that another base color which can be mixed with the blue to form the mixed color of such a mixed color area or not. If such another base color area exists, then the mixed color area is extracted together with the blue areas. At this point, it is also possible to check the linearity of the blue regions A1 and A2 and the consistency of the contour of the overlapping region C1 with the straight line including the blue regions A1 and A2, as well as the linearity of the red regions B1 and B2 and the consistency of the contour of the overlapping region C1 with the straight line including the red regions B1 and B2, so as to secure the accuracy of the extraction.

The similar check of the shapes can also be carried out for the shapes other than a straight line, such as a curve or any figure, character, etc.

Figure 10:
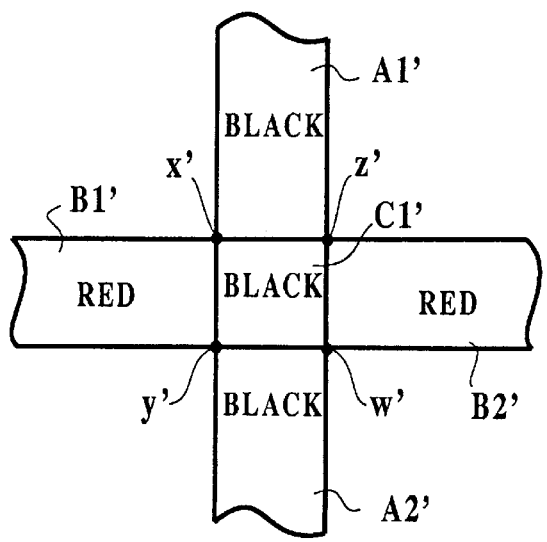
FIG. 10 is an illustration of still another exemplary input image for which the color separation in the system of FIG. 1 works effectively.

Similarly, for a still another example shown in FIG. 10, the color separation unit 2 operates as follows. In FIG. 10, a black line and a red line are overlapping. Here, if the overlapping region C1' is in a mixed color of a red tinged black, it can be handled similarly as in a case of FIG. 9. On the other hand, if the overlapping region C1' is in a black color as a result of mixing the red and the black, it is still possible to separate and extract the red straight line segment including the overlapping region C1' by joining points x' with z' and points y' with w' according to the geometrical (topological) data for the red regions B1' and B2'. Even when the red region B2' is absent and the red region B1' is curved, it is still possible to separate and extract the red region including the overlapping region C1' by joining these points in accordance with the contour of the red region estimated from the contour shape of the red region B1'.

Furthermore, in the color separation processing, it is also effective to utilize the line width data in conjunction with the color data. Namely, in addition to the color data for the portions to be separated, the threshold value for the line width or a line pitch for a hatching can be specified as a part of the form data to be registered in advance.

Figure 11:
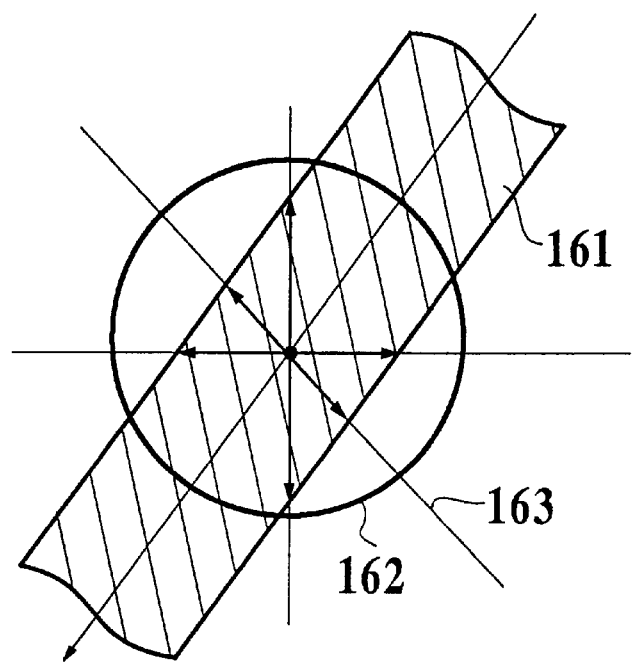
FIG. 11 is an illustration of a manner of determining a line width to be utilizing by the color separation in the system of FIG. 1.

Here, the line width of each line can be determined by any known methods. For example, as shown in FIG. 11, a circle 162 can be set up over a black line 161 appearing on the slip, and the presence of black picture elements around a center of gravity position of the line is checked along predetermined N directions as indicated by arrows, and a width of the line in a direction 163 along which a length of continuously arranged black picture elements is minimum can be selected as the line width. Alternatively, there is also a known method for obtaining an estimated line width from a run length of the black picture elements in longitudinal and transverse directions.

Then, the color separation can be achieved effectively according to both the judgement as to whether each portion has a particular color to be extracted or not based on the color data and the judgement as to whether each portion has a width not greater than the predetermined line width threshold or not based on the line width data.

As for hatching, the lines arranged in the specified line pitch can be extracted as a part of the hatching.

Figure 12:
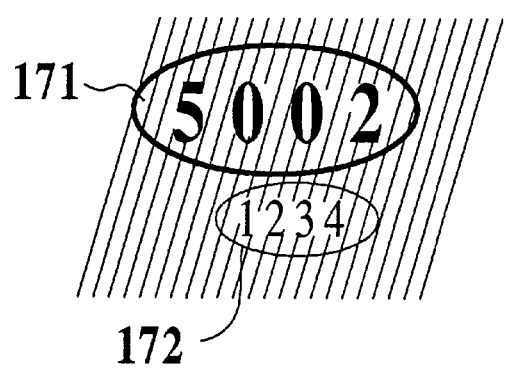
FIG. 12 is an illustration of an exemplary input image of a hatching portion for which the color separation in the system of FIG. 1 works effectively.

In addition, for a region with hatching as shown in FIG. 12, a character portion 171 in the identical color as the hatching but with a wider line width can be extracted. At this point, a portion 172 in a different color from the hatching but with the same thin line width as the hatching can be separated from the hatching.

Now, in the first embodiment, each image can be expressed in three different types including a colored image (C) in which each picture element has a color data, a gray scale image (G) in which each picture element has a concentration level data, and a binary image (B) in which each picture element has a binary value data.

Among these, the colored image is suitable for the high level recognition processing, whereas the binary image is suitable for the high speed processing. Consequently, it is not preferable from a viewpoint of system performance to allocate the color data to the portion which does not require the high level recognition processing, or to allocate the binary value data to the portion which requires the high level recognition processing.

For this reason, it is important to introduce a mechanism for specifying an image expression type with respect to each portion of the slip. In practice, the form data for the slip can be modified to register a region and a corresponding image expression type.

Figure 13:
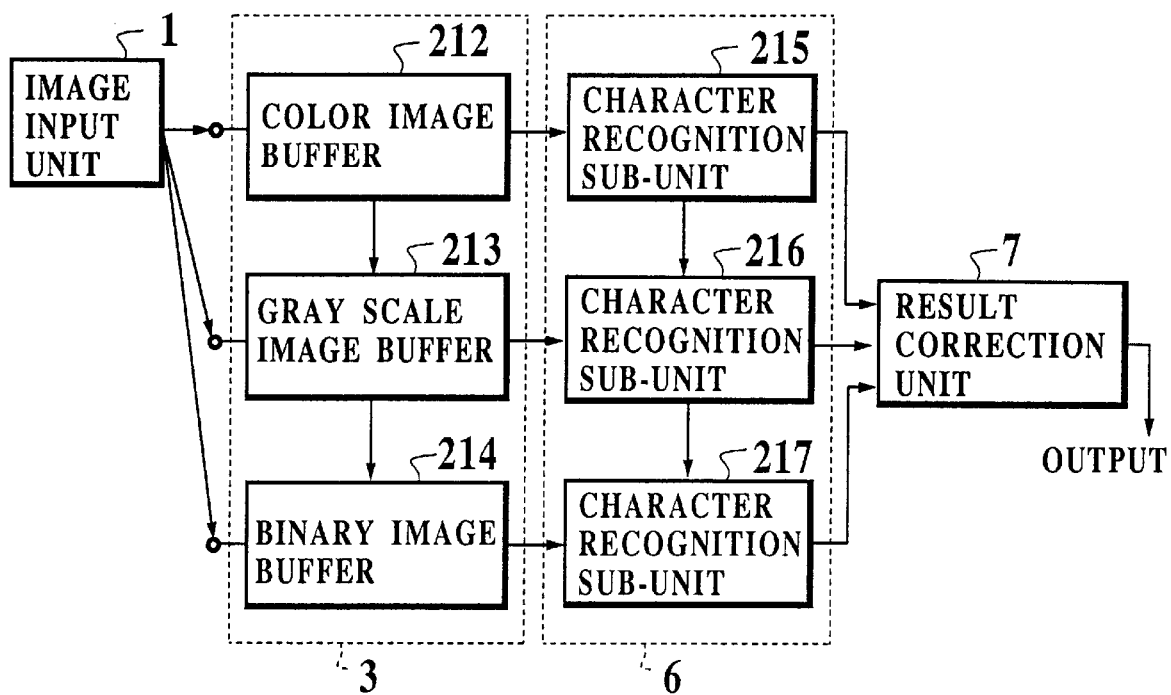
FIG. 13 is a schematic block diagram of one possible modified configuration for a major part of the system of FIG. 1.

Here, it is not necessary to limit the type of the images to be entered from the image input unit 1 to just one of these CGB types. For this reason, the configuration of FIG. 1 can be modified as shown in FIG. 13, in which the buffer unit 3 includes a color image buffer 212, a gray scale image buffer 213, and a binary image buffer 214, for storing the color image (C), the gray scale image (G), and the binary image (B), respectively, entered from the image input unit 1. In addition, the character recognition unit 6 includes a plurality of character recognition sub-units 215, 216, and 217 provided in correspondence to the color image buffer 212, the gray scale image buffer 213, and the binary image buffer 214, respectively.

Thus, in the configuration of FIG. 13, the color image (C), the gray scale image (G), and the binary image (B) are separately entered from the image input unit 1 to the respective buffers in the buffer unit 3, and the character recognition processing is applied to these images separately at the respective sub-units in the character recognition unit 6, and then the recognition results are supplied to the result correction unit 7.

In FIG. 13, the color separation unit 2, the image processing unit 4, and the character segmentation unit 5 are omitted for simplicity of the drawing. Also, the character recognition unit 6 may suffice to have at least two of the character recognition sub-units 215, 216, and 217.

In this case, which one of the CGB types is going to be suitable for the input image can be different for different types of slips to be handled, so that the form data for each slip can be modified to register a suitable image expression type for the input image, according to which the type of the image expression type for the input image to be outputted from the image input unit 1 can be requested. Namely, when the type of slip to be entered is specified by an operator, the image expression type registered in the form data for the specified type of slip is transmitted to a scanner for entering the input image data into the image input unit 1.

In a case where the image input unit 1 is unable to satisfy the request, or in a case where no request is made, the image expression type of the input image will be unknown in advance, so that the character recognition processing is carried out either in accordance with the image expression type specified in conjunction with the image data, or in accordance with the prescribed image expression type.

In a case where the image to be entered is an image file, the data stored in the magnetic disk, etc., each image file is accompanied by data indicating the image expression type of the image data. The same applies to image data transmitted through a communication line such as image data obtained by a facsimile.

The configuration of FIG. 13 is particularly useful in a system configuration in which a plurality of character recognition units, a plurality of terminals, and a plurality of image input units are connected by a network, as the image input units can use different image expression types while the character recognition units can selectively apply a suitable type of character recognition processing to each image data of each image expression type.

Figure 14:
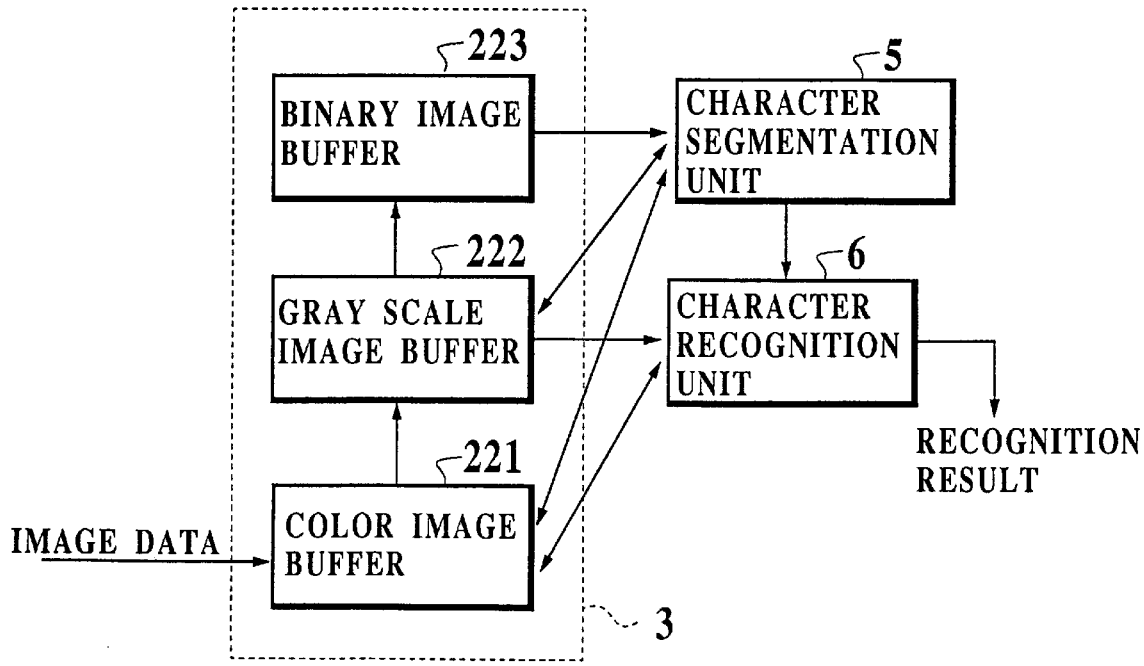
FIG. 14 is a schematic block diagram of another possible modified configuration for a major part of the system of FIG. 1.

Alternatively, the configuration of FIG. 1 can be modified as shown in FIG. 14, in which the buffer unit 3 includes a color image buffer 221 for receiving the image data, a gray scale image buffer 222 connected with the color image buffer 221, and a binary image buffer 223 connected with the gray scale image buffer 222, for storing the color image (C), the gray scale image (G), and the binary image (B), respectively, while the character segmentation unit 5 is connected with each of the color image buffer 221, gray scale image buffer 222, and binary image buffer 223, and the character recognition unit 6 is connected with the color image buffer 221, gray scale image buffer 222, and character segmentation unit 5. In FIG. 14, the color separation unit 2, the image processing unit 4, and the result correction unit 7 are omitted for simplicity of the drawing.

In this case, the binary image is obtained by binarizing the color image or the gray scale image, and the character recognition processing is applied to the binary image first. Then, when there arises a portion possibly affected by blur, batter, or contour disturbance at a time of the character segmentation or the character recognition, the corresponding portion in the color image or the gray scale image is looked up to check the correct image data. For this reason, even after the binarization, the color image and the gray scale image are stored in the color image buffer 221 and the gray scale image buffer 222.

More specifically, the color image entered from the image input unit 1 is stored in the color image buffer 221 either as it is or after being color separated. Here, the original color image and the separate color images may be stored in different color image buffers if desired.

Then, the gray scale image is obtained from the color image by calculating an average of concentration values for RGB at each picture element, and stored in the gray scale image buffer 222. In a case where the input image is given as the gray scale image, the color image buffer 221 can be skipped and the input image can be stored directly into the gray scale image buffer 222. Also, the binary image is obtained by binarizing the gray scale image, and stored in the binary image buffer 223.

Next, the binary image data for one character is taken out from the binary image buffer 223, and the character to be recognized is extracted at the character segmentation unit 5, and the character recognition processing is applied to the extracted character at the character recognition unit 6.

Figure 15A:
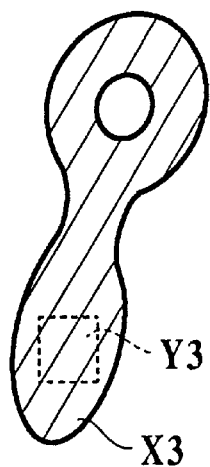
FIG. 15A is an illustration of an exemplary character image to be recognized by a character recognition in the system of FIG. 1.
Figure 15B:
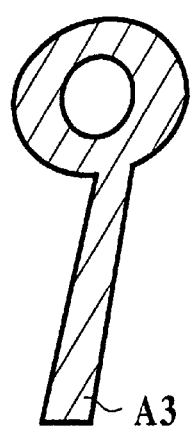
FIGS. 15B and 15C are illustrations of reference images possibly matching with the exemplary character image of FIG. 15A.
Figure 15C:
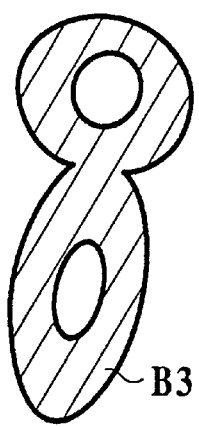

For example, in a case of recognizing the extracted character in an input pattern X3 shown in FIG. 15A, assuming that the character patterns A3 and B3 shown in FIGS. 15B and 15C are registered in advance as the reference patterns in the character recognition unit 6, the matching of the input pattern X with the reference patterns A3 and B3 is made. Here, the matching can be made by the template matching for instance. In this case, the input pattern X3 matches with both of the reference patterns A3 and B3 at nearly equal matching level, so that it is impossible to judge which one this input pattern actually is.

Here, such a possibly indeterminable set of the reference patterns A3 and B3 is associated with a detail recognition judgement process provided in the character recognition unit 6 in advance and activated whenever it is impossible to judge which one is a correct matching pattern. This detail recognition judgement process carries out a checking of a particular detailed region within the input pattern for enabling the determination of the correct matching pattern.

In the example of the input pattern X3 shown in FIG. 15A, a region Y3 of the input pattern X3 is to be checked to see if there is a hole in this region Y3. To this end, the gray scale image stored in the gray scale buffer 222 is looked up and the concentration levels in the region corresponding to the specified detailed region are checked. If the concentration levels in this region are closer to the concentration level of the background compared with the concentration levels of the surroundings of this region, it is judged that there is a hole in this region, so that the correct matching pattern for this input pattern X3 can be determined as the reference pattern B3 for a character "8" shown in FIG. 15C, whereas otherwise the correct matching pattern for this input pattern X3 can be determined as the reference pattern A3 for a character "9" shown in FIG. 15B. In this procedure, the color image in the color image buffer 221 may be used similarly to the gray scale image.

Similarly, the character segmentation unit 5 can also look up the gray scale image or the color image just as described above for the character recognition unit 6, and utilizes the reference patterns and the detail recognition judgement process provided in the character recognition unit 6.

Figure 16:
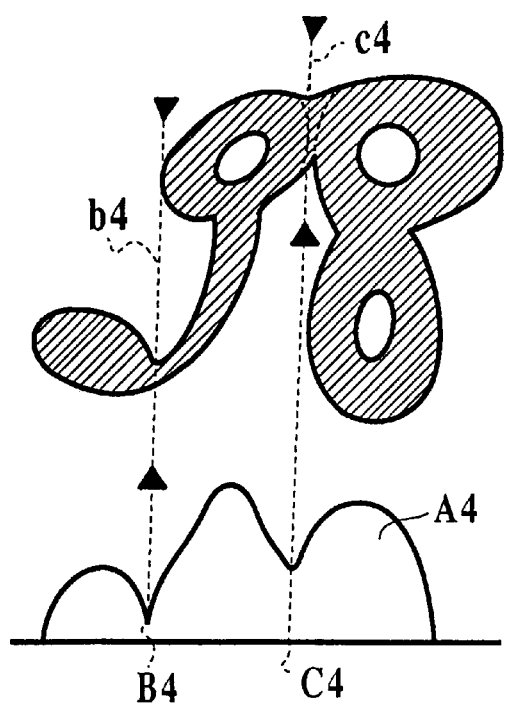
FIG. 16 is an illustration of another exemplary character image to be recognized by the character recognition in the system of FIG. 1.

For example, in a case of the character segmentation from the input pattern shown in FIG. 16 in which two characters "9" and "8" happen to be joined with each other, a distribution of the black picture elements in a vertical projection of this input pattern appears as indicated by a curve A4 shown in FIG. 16. Here, the local minima B4 and C4 of this curve A4 are selected as candidate cutting points, and the corresponding candidate cutting sections b4 and c4, respectively, on the input pattern to be determined. Then, the corresponding regions in the gray scale image or the color image are looked up to see which one of the candidate cutting sections is appropriate for actual cutting.

Namely, a priority order for the candidate cutting section which is judged to have a color or a concentration level closer to that of the background is raised. In a case of the input pattern of FIG. 16, the priority order is originally higher for the candidate cutting section b4 due to a smaller number of the black picture elements indicated by the curve A4 at the point B4, but when it is judged that the color or the concentration level at the candidate cutting section c4 is judged to be closer to that of the background, the priority order for the candidate cutting section c4 can be raised above that of the candidate cutting section b4, such that the erroneous character segmentation can be prevented.

It is also possible to utilize other character segmentation schemes, such as those using the contour data, the extracted character width, and other features, either singly or in combination.

Thus, generally speaking, whenever there arise a portion to be checked again from the character recognition process, feedback is provided to look up the color image or the gray scale image, to correct the blur, batter, or contour disturbance, while various processings for the line segment extraction, the layout comprehension, the form comprehension, the character segmentation, and/or the character recognition are applied at the image processing unit 4, the character segmentation unit 5, and the character recognition unit 6.

Now, various other features of the first embodiment of FIG. 1 will be described in detail.

First, the image input unit 1 can carry out color printing shear correction, color bias correction, and color conversion as follows.

Namely, color printing shear correction can be carried out by shifting each color according to color printing shear correction parameters specifying an amount for shifting to each of RGB.

Also, color bias correction can be carried out by transforming the concentration level of each of RGB. Here, the transformation of the color concentration level can be achieved by the so called gamma transformation for transforming the concentration level of each color according to the concentration of that color itself alone, or by providing a function which determines the concentration level of each color according to the concentration levels of all of RGB. In this case, the color bias correction parameters can be numerical data for determining such a function, or a transformation function itself.

In the configuration of FIG. 1, such color printing shear correction parameters and the color bias correction parameters are provided in the image input unit 1 such that the color printing shear correction and the color bias correction can be carried out with respect to the input image.

Here, when the recognition error or the extraction error occurs frequently in a course of the character recognition processing or image processing operations such as feature extraction, line segment extraction, binarization, etc., or when some malfunction or contradiction is caused, the color printing shear correction without using the correction parameters is carried out to obtain the new correction parameters, and the correction parameters are updated whenever the new correction parameters differ from the previous ones. This updating operation can be carried out regularly, or in response to the operator command.

It is also possible to provide a plurality of sets of correction parameters in correspondence to a plurality of image input units, in which case the correction operation according to the correction parameters and the updating operation of the correction parameters are going to be carried out at each image input unit independently.

The color printing shear correction parameters can be obtained by the color analysis based on the black portion of the slip. Here, the black portion can be extracted automatically from the input image, or its location, size, and shape can be predetermined by the form data specified in advance.

In a case where a pattern of the predetermined shape is set on the slip, the operation is going to be carried out according to a pattern or mark for color printing shear correction, such as a cross shaped pattern set in a particular portion of the slip in advance. Here, the position, shape, etc. of such a pattern or mark may be registered in the form data. Also, the pattern portion can be formed to serve another purpose such as a character frame for the slip number as well.

The color analysis for the color printing shear correction is carried out by measuring rates of the complementary colors present on the upper and lower sides as well as on the left and right sides. Such measurements are made at a plurality of locations, and either an average of the measurement results is used as a common color printing shear amount for the entire image, or each measurement result is used as a local color printing shear amount at each location. In the latter case, the non-uniform color printing shear over the entire image can also be handled.

For example, the color printing shear correction can be carried out as indicated in FIG. 17. In the exemplary case of FIG. 17, there are double blots on both sides of the black portion at a middle area, where borders between adjacent color strips are indicated as A1 to A6. Here, on the conditions that the color of the area between A1 and A2 (blue green) and the color of the area between A4 and A5 (red) are complementary, and the color of the area between A2 and A3 (blue) and the color of the area between A5 and A6 (yellow) are complementary, the distances from A1 to A2 and from A1 to A3 can be judged as the color printing shear amounts of the green and blue with respect to the red signal, respectively. Here, two colors are in a complementary relationship when a sum of these two colors makes or approximates the background color (white in FIG. 17) outside the A1 to A6 areas. This concept is also applicable to a case in which the central region between A3 and A4 is missing.

It is also possible to handle a single blot rather than the double blots as shown in FIG. 17, by regarding the color printing shear amounts for two colors to be identical. Also, the example of FIG. 17 shows a case in which the color printing shear occurs in an order of RGB, but the order of shearing may be different and can be judged from the color of each area.

The same concept also applies to the non-black portion. In such a case, the color printing shear correction parameters are determined according to the change of the colors in the adjacent portions. In other words, when the concentration levels of the RGB in the background are R0, G0, and B0, and those in the target portion are R1, G1, and B1, the change of the colors in the portion with the color printing shear appears as indicated in FIG. 18, so that the occurrence of the color printing shear as well as the color printing shear amount can be judged according to FIG. 18.

In the example of FIG. 17, when the sum of the area between A1 and A2 and the area between A4 and A5 makes the color of the area between A3 and A4 and the background color added together, and same is also true for the area between A2 and A3 and the area between A5 and A6, the distance s from A1 to A2 and from A1 to A3 are going to be judged as the color printing shear amounts for the green and the blue with respect to the red signal, respectively. Also, when the area between A3 and A4 is missing, or when there is a single blot rather than double blots, R0, G0, B0, R1, G1, and B1 can be determined from the color of each area, so that the color printing shear amount can be obtained similarly.

On the other hand, it is also possible to detect a color printed mark as shown in FIG. 19 and to detect the color printing shear amount by checking the shearing of each of RGB in the mark.

It is also possible to carry out color bias correction according to each color in such a mark. Namely, the color bias correction parameters or function can be determined according to the difference between the color data for the mark obtained from the image input unit 1 and the expected color data.

It is also possible to set up a pattern for the color printing shear correction at a particular portion on a surface to be scanned by a scanner which generates the image data to be entered into the image input unit 1, such that the color printing shear correction and the color bias correction can be carried out according to the pattern included in the input image.

It is also possible to obtain the color printing shear amount by a method indicated in FIGS. 20A and 20B. In this method, the waveforms of RGB at a portion where the concentration levels of RGB are changing as shown in FIG. 20A are superposed with each other as shown in FIG. 20B by displacing the waveforms to make a matching, and the amount of displacement for each color required to realize the best superposition is determined. Here, the matching can be realized by utilizing the matching technique widely used in the field of the pattern recognition.

It is also possible to construct the system such that the color printing shear correction is carried out only at the color changing portion of each color as shown in FIG. 20A, and the color printing shear correction is omitted at the portions unaffected by the color printing shear, such as the background portion, inside of the printed portion, inside of the handwritten portion, etc., since the color displacement makes no change in these portions. In this manner, the color printing shear correction can be carried out at a higher speed. It is also possible to make it easier for the operator to confirm the color printing shear state by providing an enlarged display of the particular portion or a portion in which the color printing shear is apparent in the input image.

In the color printing shear correction, the color can be displaced in units smaller than picture elements forming the input image by utilizing interpolation. In this case, the concentration value of the position to which each color is to be displaced can be determined by the interpolation from the concentration values of the picture elements in a vicinity of that position.

The above described corrections are applicable to a case in which each of RGB images is de-focused differently.

Namely, FIG. 21 shows an exemplary case in which the red portions appear on both sides of the black portion, which indicates the fact that the blurred color is caused as the green and the blue are de-focused with respect to the red. When the same color appears on both sides rather than the complementary colors as such, it is possible to obtain the blurred color correction parameters, such that the level of blurred color of each color can be equalized by using the blurred color correction parameters.

Also, instead of carrying out these various correction operations at the image input unit 1 as described above, these correction operations can be carried out in a course of the character extraction process or the character recognition process by using the appropriate correction parameters.

In the configuration of FIG. 1, the input image to which the color printing shear correction and the color bias correction as described above are applied by the image input unit 1 is going to be supplied to the color separation unit 2.

Next, the color separation unit 2 carries out the slip color registration operation as follows.

When the slip (either already written in or not yet written in) is entered at an OCR, the color analysis is carried out on the image of the entered image to check the colors of the entered slip, i.e., which portion is in which color, and the color data are registered in the form data accordingly. Here, the data to be registered can range from just the number of available colors and the color data (RGB) to the actual slip image altogether.

Of course, at this point, the registered content can be corrected by the operator interactively. This correction can be carried out by the trial and error process for extracting (deleting) various different colors from the test input slip image, so as to register the color by which the printed portion of the slip can be extracted (deleted) appropriately in the form data.

It is also possible to display the artificial color data or the input image of the slip on the display screen such that, when a position on the display is specified, the RGB or VSH (Value, Saturation, Hue) or the color name for the specified point can be outputted, in order to assist the operator to determine the color to be registered.

It is also convenient for the operator to be allowed to enlarge or contract a part of the image by means of a zooming function.

The color separation processing for separating and extracting a particular color is then carried out according to the form data prepared as described above.

Namely, according to the color data registered in the form data (including the background color and the writing color, each of which may have a plurality of options), the portions to be deleted are removed and the portions to be recognized are extracted and recognized.

In this case, it is also possible to make it such that the portions to be deleted can be determined automatically from the color data obtained from the input image alone, independently from the form data. For example, the particular color alone can be deleted in a simple case, or else the likelihood of the line constituting the form portion of the slip or the color of the form portion can be determined automatically from the color indicated by the color data. The same applies also to the portions to be recognized.

It is also possible to carry out the color separation according to VSH converted from RGB. It is also effective to define a distance in the space of RGB or VSH and carry out the color separation according to the distances. Also, the color separation according to the color names to be defined is suitable in a case of using the man-machine interface. In this case, the form data can also be given in terms of the defined color names.

In the system of this first embodiment, the color name is registered in correspondence to color representation data such as RGB or VSH, such that the color name registered in the form data is used by being converted into the color representation data such as RGB or VSH, and conversely the color representation data such as RGB or VSH is presented to the operator by being inversely converted into the closest color name.

Now, in the color separation unit 2, the color separation target can be selectively specified from various different cases, of which the major choices includes a case for separating a particular color, a case for separating colors other than a particular color, a case of separating achromatic colors, a case of separating chromatic colors, a case of separating white, a case of separating black, and combinations of these.

In a case of separating a particular color, the judgement is made with reference to the hue (H) mainly, whereas in a case of separating achromatic colors or chromatic colors, the judgement is made with reference to the saturation (S) mainly. In a case of separating white or black, the judgement is made according to the level of the value (V) among those having a small saturation (S).

On a basis of the color separation result, it is possible to select a color which has a high probability for being the background color of the slip such as the most dominant representative color, for example. Namely, among the representative colors, one which covers the largest area in total is going to be selected. It is useful to output this selection result as an automatically estimated background color in addition to the recognition result. It is also useful to output the color of a recognized form portion of the slip or a particular portion on the slip in addition.

Also, in addition to the character codes obtained as the recognition results, it is useful to output the color of each recognized character on the slip, the color of the background at the location of each recognized character, the color of the character frame enclosing each recognized character, etc. In such a case, it is also possible to utilize the color information for the form portion in judging a type of each slip along with the other information, such as the ruled line information.

It is also possible to construct the system such that an alarm sound or warning display can be presented to the operator or the correction screen display can be changed according to the extracted color information.

It is highly important to change the color separation scheme for different regions of the slip.

In this regard, the form data includes in advance definitions of the regions, and indications as to whether the usual binarization processing is to be carried out or the color separation processing is to be carried out at each region. Then, at a time of the actual processing, a slip as shown in FIG. 22 can be entered, for example. In the slip of FIG. 22, the form data specifies that an area 181 is to be recognized while an area 182 is to be outputted as the image data as it is, for example.

In such a case, at the area 181, there is a need to carry out character recognition by removing the pre-printed portion forming the character frames. On the other hand, at the area 182, the pre-printed portion forming the character frames and the item names should not be deleted, so that the colors of the pre-printed portions cannot be extracted uniformly over the entire slip.

In this case, the image is entered in terms of the color data according to the form data for the area 181, while the image is entered in terms of the binary value data for the area 182. Here, for the area 182, the binarized image may be obtained by calculating an average value of RGB in the entered color data to obtain the monochromatic image first and then binarizing the obtained monochromatic image. Then, in the area 181, the color of the character frame is separated and deleted according to the form data, and then the character recognition is carried out, while the image data is outputted as it is for the area 182.

In this manner, it is possible to limit the time consuming color separation operation to only a part of the slip. The usual binarization processing can be executed in a short time, so that by limiting the color separation operation to only a part of the slip, it becomes possible to achieve an improvement of an overall processing time.

Instead of changing the regions to be applied with the color separation as described, it is also possible to adopt a scheme in which the color separation scheme can be selected from a plurality of schemes.

For example, the character recognition and the stamp extraction can be carried out at a high speed by registering the form data such that, at the stamp portion in the area 182, the color separation process for separating red or vermilion usually used for the personal stamp (seal) is activated, while at the area 181, the color separation process for separating black is activated. In this manner, the processing can be carried out at a higher speed compared with a conventional scheme for separating all the representative colors for all the regions as in the Japanese Patent Application Laid Open No. 3-14077 (1991) mentioned above.

Similarly, it is also possible to adapt the form data such that the character segmentation processing, character recognition processing, post-recognition processing, etc., can also be selectively specified from a plurality of schemes.

It is also convenient to carry out the color separation of a particular color at a particular portion of the slip to judge the presence of that particular color at that particular portion, and to obtain the recognition result for the recognition target object given in that particular color. In a case where the recognition target object in that particular color is judged to be absent, the absence is notified accordingly. At this point, it is also possible to output the color of the object actually present in that particular portion. Of course, it is also possible to output the judgement result or the color information alone without carrying out the recognition of the recognition target object at this point.

Here, it is possible to provide a stamp judgement unit in the system in order to judge the presence or absence of the stamp as well as a type of the stamp, and to output these judgements as the recognition result. For example, the system can be constructed such that, when the stamp is absent or the stamp is not in the required type, the notice or the warning can be given to the operator automatically. Namely, the alarm sound or the warning display can be presented to the operator according to the obtained stamp data. In addition, the correction screen display may also be changed according to the obtained stamp data.

In the stamp judgement unit, the stamp can be judged from the image obtained by the color separation of a particular color such as red, according to the fact that the target portion in that color is present, the fact that the outer contour of that portion has a circular or an oval shape, and the fact that the inner part of that portion is rather complicated.

Also, the judgement of the similarity of the stamp type can be achieved by the pattern matching processing widely used in the field of pattern recognition.

It is also possible to display the result obtained by the color separation of the slip or the result obtained by applying some other processing on a display screen and the confirmation of the displayed result by the operator can be awaited before the next processing is carried out. Here, for a case where the operator is not satisfied with the displayed result, it is also possible to provide a mechanism for allowing the operator to directly make a correction to the displayed result, or a mechanism for allowing the operator to command the retrying of the processing by changing some parameters.

Also, at a time of color separation, when the color which is difficult to judge is encountered, a portion in that color can be displayed along with its surrounding, if necessary, in order to urge the operator to identify that color. Thereafter, the color separation can be carried out according to the color identified by the operator.

It is also possible to carry out the character recognition processing as follows.

First, when the portion corresponding to the blank area to be filled has a part that can be separated by the color separation of a first particular color such as black, and that part can be recognized as the character string, the recognized character string is outputted as the recognition result. Then, if necessary, the similar operation can be repeated for up to the N-th particular color. Here, when the particular color is not identical to the color of the form portion of the slip, it is regarded that the character frames and the blank areas are already deleted so that the character recognition in the recognition without frame mode is applied, whereas otherwise the recognition with frame mode is applied. A blank is outputted when it is regarded that there is nothing present anywhere in the blank area.

Alternatively, it is also possible to carry out the character recognition processing such that when the portion separated as the color which is not identical to the color of the form portion of the slip is present in the blank area to be filled and that portion is recognized as the character string, then the recognized character string is outputted. In this case, it is regarded that the character frames and the blank areas are already deleted, so that the character recognition in the recognition without frame mode is applied. Then, when the region at which the color identical to that of the form portion is present is small in that blank area, it is regarded that the handwritten characters are entered in the identical color as the form portion, and the character recognition with frame mode is applied. A blank is outputted when it is regarded that there is nothing present anywhere in the blank area. Here, these steps may be carried out in an arbitrary order.

Here, the recognition without frame mode is a mode in which the character segmentation and the character recognition are carried out on an assumption of the absence of the character frames, for which various schemes are known.

On the other hand, the recognition with frame mode is a mode in which the character segmentation and the character recognition are carried out on an assumption of the presence of the character frames. This mode further includes a recognition with frame of known shape mode in which the position and the shape of the character frame are given by the form data in advance, and a recognition with frame of unknown shape mode in which the position and the shape of the character frame are unknown. Either one of these modes can be selected according to the content of the form data.

In addition, each of these modes is further classified into a recognition with ruled line contact mode and a recognition without ruled line contact, one of which is selected according to the state of the actual pattern to be recognized. The selection of these modes can be made by the following procedure. First, the character frame estimation processing is carried out to determine the character frame position or its candidates. Then, the character portion is estimated and the level of contact between the characters and the character frame is checked. Here, if there is no or little contact, the recognition without ruled line contact mode is selected. It is of course possible to make it such that the recognition mode is not changed according to whether there is a contact or not. Next, the character segmentation and the character recognition are carried out according to the obtained ruled line position data. Here, in a case there is a ruled line contact, the appropriate processing for separating the characters from the ruled lines is carried out.

In this procedure, the character segmentation and the character recognition with and without the processing for separating the ruled lines and the contacting characters can be realized by utilizing the conventionally known techniques.

In this manner, it becomes possible to construct the recognition system with much superior accuracy compared with a case of using the same character recognition scheme all the times.

It is to be noted that the color separation and the color printing shear correction can be carried out simultaneously, and even color bias correction and blurred color level equalization correction can be carried out simultaneously. For example, in a case of separating the black portion, if the color printing shear correction parameters are known in advance, the shifting of each of RGB and the color separation (extraction of a particular color) can be carried out simultaneously. Also, even when the color printing shear correction parameters are not determined in advance, when the complementary colors are present on both sides of the black portion, the color printing shear can be estimated according to these complementary colors, and the black portion can be separated by regarding that each of RGB has been shifted according to the estimated result. The similar processing can also be carried out for the other colors.

Next, the color representation at the image processing unit 4 in the configuration of FIG. 1 will be described in detail.

The image processing unit 4 represents each line of the image as a run length for a plurality of representative colors obtained by the color separation, i.e., the colors selected by ignoring the minute variations, or for the input image data, and a pointer is produced for a representation of each line. Then, the image processing unit 4 produces a table of pointer sequence, and stores data comprising the produced pointer sequence and the run length representations of the representative colors as the image data. Then, using such an image representation as an input, the image processing or the character recognition are carried out according to the color representations.

First, the character recognition and the image processing can be carried out by converting a part of the image using the colored run length representation into the original bit map data. Here, if the run length representation for each color and the pointer for each color are not provided, the data for a part alone cannot be decoded, so that the entire image must be decoded. Also, there has been a scheme for carrying out the character recognition with respect to the image representation in a form combining the table of the pointer representation and the monochromatic run length data representation as disclosed in U.S. Pat. No. 4,426,731, but it has been impossible to handle the color image in this scheme.

In order to convert a particular portion in a particular color into the bit map data, either the color representing run length data are looked up from the pointer for a line corresponding to that portion, and only those concerning that particular color are converted into the bit map data, or the bit map data are obtained from the run length data pointed by the pointer for that particular color in that particular portion. In this manner, the particular color in the particular portion alone can be extracted at a high speed, and the character recognition and the image processing can be carried out according to the obtained bit map data, so that it is possible to realize the much faster processing compared with a case of decoding the entire image. It is also possible to realize an even fast processing by processing the run length representation directly without decoding.

The representative colors appearing in the slip are registered in the form data in advance, and extracted either according to the form data or else automatically, and then the image is represented according to these representative colors as follows.

Figure 23:
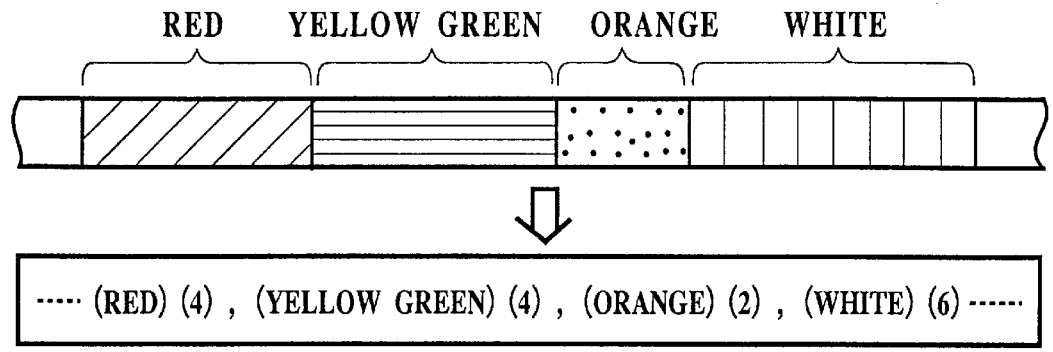
FIG. 23 is a diagrammatic illustration of a run length representation of the colors used in the system of FIG. 1.

Namely, for a code C representing the representative color and a length L for which this color is continuing or its encoded form, a set of C and L is obtained, and each line of the image is represented by a series of such sets. FIG. 23 shows an exemplary encoding form which is effectively the colored run length representation.

Figure 24A:
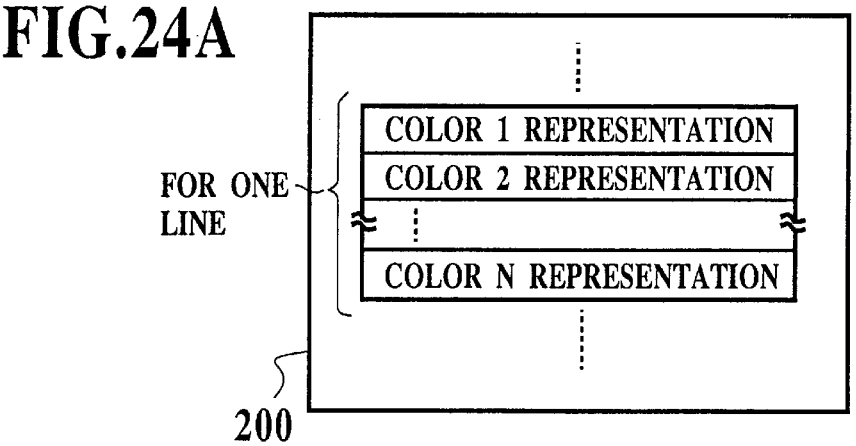
FIGS. 24A and 24B are diagrammatic illustrations of two possible image representation schemes using the run length representations in the system of FIG. 1.

It is also possible to use a scheme for coding the run length for each representative color. In this case, the run length data can be given in a representation form 200 shown in FIG. 24A in which the run length representations of the representative colors for each line are collected together, or in a representation form 201 shown in FIG. 24B in which the run length representations of the representative colors for the entire image are collected together. Also, the pointer for specifying the top of the run length representation for each line can be set up in a form 202 shown in FIG. 24C in which the pointers for the representative colors for each line are collected together, or in a form 203 shown in FIG. 24D in which the pointers for the representative colors for the entire image are collected together.

It is also possible to quantize each of RGB and apply the similar run length coding to each of RGB. Here, the coding is realized by ignoring the slight color difference among the neighboring picture elements as noises and approximating the colors by the representative colors and the quantized concentration levels.

The exemplary cases for the direct application of the image processing to the images in the run length representations can be found in Japanese Patent Application Laid Open No. 62-246138 (1987) and Japanese Patent Application Laid Open No. 62-307615 (1987) for example. These examples concern with the image processing scheme with respect to the monochromatic run length data, but they can be applied to the run length representation for each color. It is also possible to carry out the character recognition according to these image processing techniques.

For instance, in a case of detecting a long straight line of a particular color within a particular region, the run length data for representing the particular color in the portion containing that particular region is obtained according to the pointer for pointing that particular region. Then, those which are contained in that particular region and having long run lengths are obtained, and the adjacent long runs are unified together to detect the straight line.

As another example, an exemplary case of directly applying the image processing with respect to the images in the colored run length representations will be described now. In this example, the image processing is the color printing shear correction processing.

Here, by carrying out the image processing, the character segmentation, and the character recognition according to the coded data, it becomes possible to speed up the processing speed compared with the processing with respect to the RGB images, for example, and also the data amount required for representing the images can be compressed.

It is possible to carry out the color printing shear correction with respect to the data in the colored run length representation. For example, in a case the run length representations are produced by separating RGB from the image as in a form 203 shown in FIG. 24D, the shifting in unit of one picture element can be easily realized by changing the length of the top run for each line.

The shifting in unit less than one picture element can also be realized as follows. First, the values of the picture elements at the boundary portions of each run are checked and the length of each run is transformed from an integer into a real number according to the obtained concentration levels. Then, the length of each run is changed to be longer for that which has the higher concentration level for that color at the boundary picture element, and shorter for that which has the lower concentration level for that color at the boundary picture element. At this point, a total length of all the runs is to be maintained constant.

Next, the length of the top run is changed according to the shifting amount. In a case the run length representation for one line is given from left to right and when the shifting to the left is required, the top run is shortened for that shifting amount, whereas when the shifting to the right is required the top run is elongated for that shifting amount. Then, the lengths of the runs are turned into integers without changing to total length of all the runs. In this manner, it is possible to realize the shifting of the image on the run length representations.

Figure 24B:
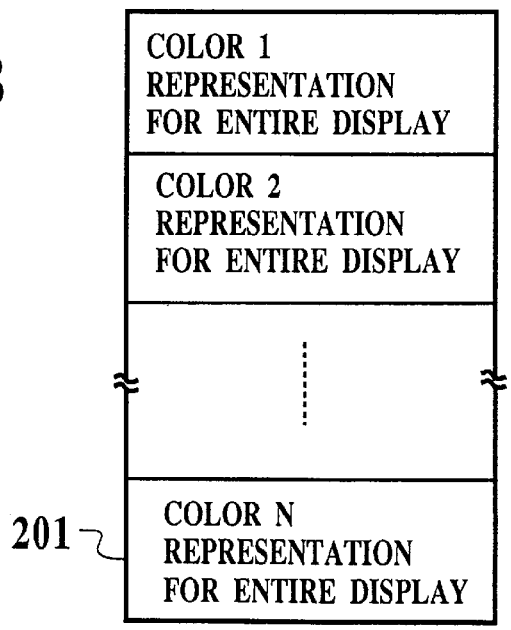

In a case the image is represented by the set of the color code and the run length representation as in the form 201 shown in FIG. 24B, the series of three or four runs in the run length representation for one line is checked. Then, whether there is a possibility for the color and the length of the run sandwiched by the runs at both ends in this continuous runs to be caused by the color printing shear or not is judged from the color of the runs at both ends and the shifting amount, and that run is deleted when it is caused by the color printing shear, and the lengths of the runs at both ends are changed as they should because the shifting of each color is made.

Figure 24D:
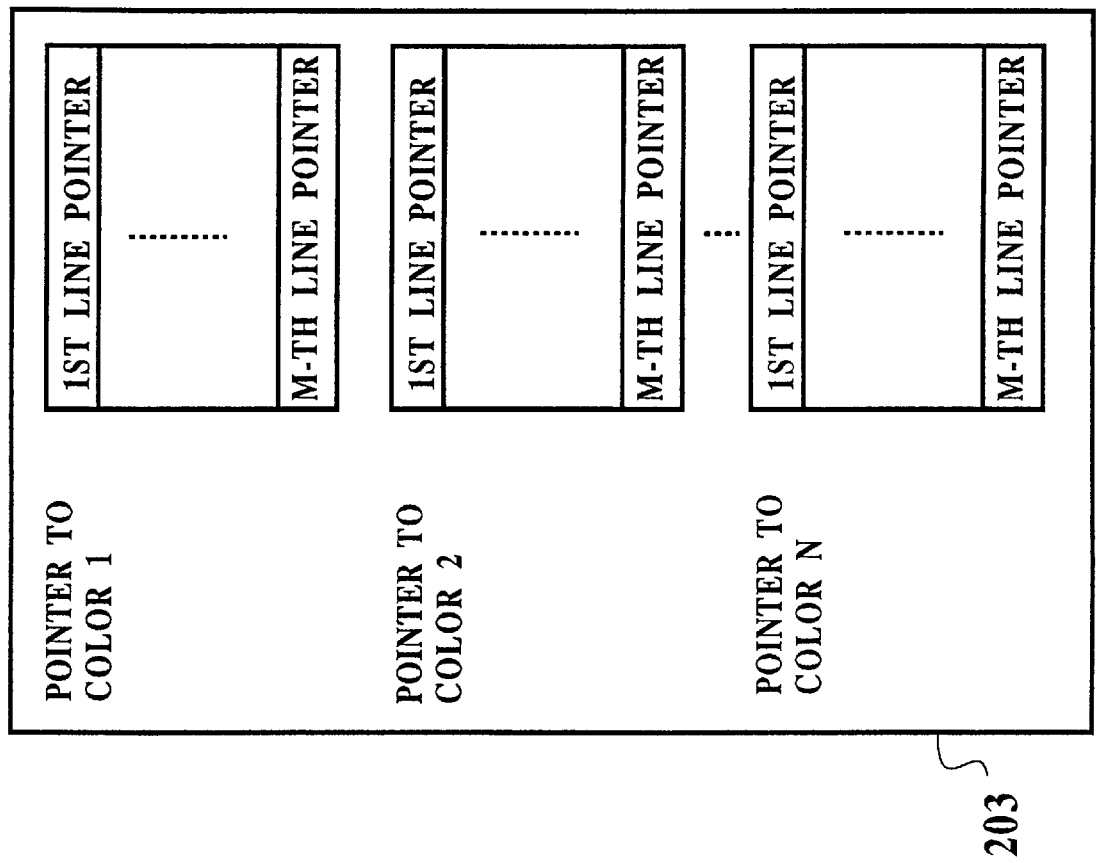
FIGS. 24C and 24D are diagrammatic illustrations of two possible pointer tables for the run length representations in the system of FIG. 1.
Figure 24C:
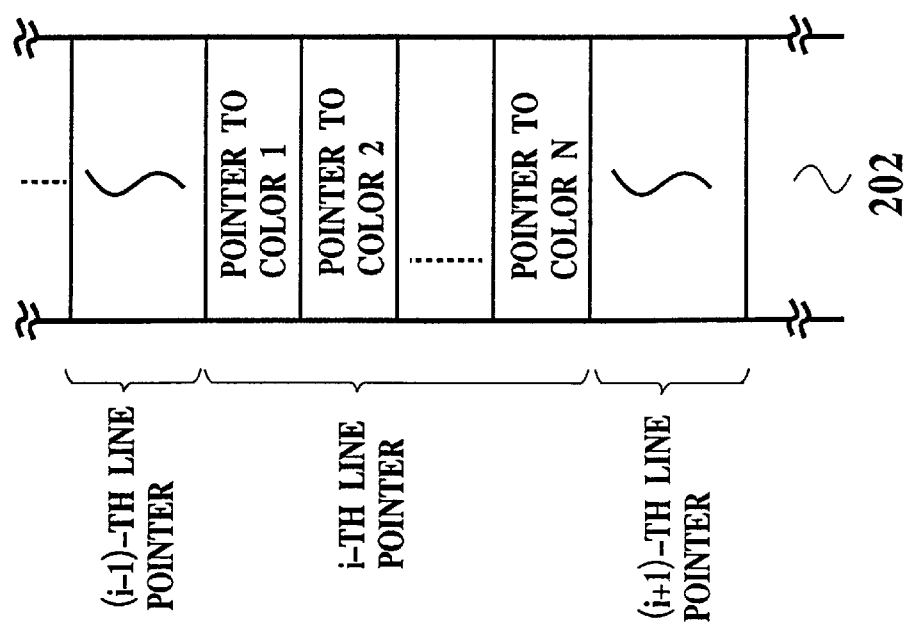

It is also possible to apply the color separation for separating RGB to each run so as to convert the representation into that similar to the form 203 of FIG. 24D, and carry out the shifting for the color printing shear correction in the converted representation, and then the representation can be converted back to the original representation.

In any case, each color in the colored run length representation can be shifted without converting the representation into the original image directly.

Here, by carrying out the above described color separation in two steps, the processing speed can be increased. Namely, in the first step, the color separation is carried out by ignoring the minute color differences, and the first colored run length representation is produced according to the result of the first color separation.

Then, the second color separation is carried out according to the obtained first colored run length representation data. Then, if necessary, the second colored run length representation is produced according to the result of the second color separation, and the obtained second colored run length representation is used as the input data for the image processing or the character recognition.

In general, the color separation requires a considerable processing time, so that by carrying out the rough color separation in the first color separation using the simple high speed scheme, and then carrying out the rather time consuming fine determination of the representative colors in the second color separation with respect to the rough color separation result, it becomes possible to carry out the color separation processing at a higher speed compared with a case of applying the fine color separation directly to the original image.

Here, as the second color separation scheme, those already mentioned above can be used as they are rather time consuming schemes. On the other hand the scheme disclosed in Japanese Patent Application Laid Open No. 4-160486 is a simple and high speed scheme, so that it is suitable for the first color separation.

As for the RGB values, it is more convenient to carry out the color processing in the space of VSH by transforming RGB into VSH, and the color can also be specified more conveniently in terms of VSH. Here, the transformation of RGB into VSH can be realized as follows.

First, the value (V) can be defined as an average of the concentration levels of RGB. Next, the saturation (S) can be defined according to the minimum concentration level. Namely, for the minimum concentration level closer to 0, the saturation takes a higher value, because in such a case the concentration level difference between the color at the high concentration level and the color at the low concentration level is larger so that more vivid color can be obtained. In order to define the hue (H), the numerical value corresponding to each of RGB is set up. For instance, R can be set to 0, G can be set to 128, and B can be set to 192. In a case of expressing the change of the color from B to R, R is treated as 256. Then, a numerical value between the numerical value indicating the color at the maximum concentration level and the numerical value indicating the color at the second maximum concentration level is obtained from the ratio of these concentration level, and this obtained numerical value is set as the hue of the input color.

More specifically, the transformation can be achieved by the procedure according to the following program written in the C language, where r, g, and b denote the concentration levels of RGB, and h, s, and v denote the values of HSV.

```
v = r + g + b;
if (v = 0) {c = 0; h = 0;}
else
{ r = (r*255)/v;
  g = (g*255)/v;
  b = (b*255)/v;
  if (g > 0)
  {
    if (g > b)
    {/*r>g>b*/s = 255-b*3; h = ((g-b)*129)/(r+g-2*b);}
```

```
        else if (b > r)
            {/*b>r>g*/s = 255-b*3; h = ((r-g)*65)/(b+r-2*b)+192;}
        else
            {/*r>=b>g*/s = 255-g*3; h = ((r-g)*65)/(r+b-2*b)+192;}
    }
    else
    {
        if (r > b)
            {/*g>=r>b*/s = 255-b*3; h = ((g-b)*129)/(g+r-2*b);}
        else if (b > g)
            {/*b>g>=r*/s = 255-r*3; h = ((b-r)*65)/(b+g-2*r)+128;)
        else if ((g > b || (b > r)
            {/*g>=b>=r*/s = 255-r*3; h = ((b-r)*65)/(g+b-2*b)+128;}
        else
            {/*g = b = r*/s = 0; h = 0;)
    }
}
if (h > 255) h = 0;
if (s >= 128) s = (s -128)/4 + 224;
    else s =(s*224)/128
v = v/3;
)
```

A manner of realizing this transformation is not necessarily limited to the above procedure, and can be obtained by the table look up operation. Namely, the values of RGB are quantized such that these colors can be represented by NR, NG, and NB bits, and the table with an address space of NR+NG+NB bits is prepared to store the HSV values corresponding to the color represented by the RGB at the address corresponding to the values of these RGB within the table. Also, the color representation of the input image entered from the image input unit 1 can be given in terms of VSH. In addition, the above transformation can be carried out simultaneously with the color bias correction, or with the color printing shear correction.

Next, the cancellation lines processing at the character recognition unit 6 will be described in detail.

In this case, the color separation is applied to the input image to separate the colors of the written characters and the portion corresponding to the color of the stamp. Then, the character recognition is carried out with respect to the image data in the separated colors. At this point, when one or two long transverse lines are found at the character writing portion, these transverse lines are judged as the cancellation lines. Here, the long transverse lines can be detected by finding out the run in the transverse direction, for example. In a case where the lengths of the detected lines are not sufficiently long, the possibility for these lines to be a character or a contacting character is also checked.

When such a character segmentation and the character recognition fail, the possibility for the detected lines to be the cancellation lines increases. According to this result, when these lines are judged as the cancellation lines and the correction characters are present in a vicinity, these characters in a vicinity are recognized as the correction characters, and it is judged that the detected lines are indeed most likely the cancellation lines for actually cancelling that cancelled portion.

Next, a part of the image data in the color of the stamp corresponding to the position of the cancelled portion is taken out, and whether the sufficient amount of the stamp color is present there or not is checked, and if not, the warning is generated to the operator of the system. Also, the warning can be presented as a flag, and the presence or absence of the sufficient stamp color can be outputted in conjunction with the recognition result.

As for the judgement of the stamp, the stamp judgement unit as described above can be provided to judge the presence or absence of the stamp at the cancelled portion according to the shape of the image data in the stamp color. Here, when the stamp judgement unit is capable of judging the similarity of the shapes of the stamps, it is also possible to output the type of the stamp found at the cancelled portion in conjunction with the recognition result.

Normally, the color of the stamp differs from the writing colors, so that the highly accurate judgement can be made by carrying out the stamp judgement by taking out the portion in the color of the stamp alone. The overlaps between the writing portion and the stamp can also be handled by the above described color separation processing. It is also possible to carry out the judgement or the matching of the stamp for a possibility of the presence of the stamp in the writing portion.

Now, the character type identification at the character recognition unit 6 will be described.

Namely, the character with a thick character line indicates that this character is a pre-printed one, and when many such evidences for the presence of the pre-printed character are found, the character segmentation and the character recognition for the pre-printed characters are going to be applied. Here, the character segmentation and the character recognition for the pre-printed characters can be applied at a higher priority.

Next, the correction display screen in the result correction unit 7 will be described in detail.

Here, the form image of the slip is taken out by the color separation processing for example, from the entered image data. The form image can be separated in view of the color alone, but it can also be extracted by carrying out the ruled line extraction processing for a particular color. The form image can be taken out in a form of the bit pattern, or the vector data in which it is represented by a combination of the line segment data specified by the starting point coordinates and the ending point coordinates.

Then, the characters on the slip are recognized from the image data obtained by the color separation. At this point, data such as a location and a size of each recognized character are stored.

Next, the obtained form image is displayed in a color resembling the actual color of the form image of the slip which is obtained by the color analysis. Here, the resembling color can be either a predetermined corresponding color specified by the prescribed correspondence relationship, or an approximating color obtained by the calculation.

In addition, at this point, the characters of the recognition result are also displayed in superposition at their respective locations. Here, the characters can be displayed in the color corresponding to the actual writing color.

Here, a part or a whole of the display can be displayed along a part or a whole of the current image display in such a manner to establish the correspondences of the positional relationships among them.

Referring now to FIG. 25, the second embodiment or an image processing system according to the present invention will be described in detail.

The first embodiment of FIG. 1 described above concerns with a case in which the externally given image data are processed as they are as the input images. In contrast, the second embodiment is concerned with a case of using the input images which are the image data transmitted through a communication line or the image data stored in a memory device.

In this case, if the image data alone are transmitted or stored, the side which processes the image data cannot have any clue for performing the color corrections.

For this reason, the system of the second embodiment has a configuration shown in FIG. 25 for a case of the application to the communication system, which comprises: an transmission unit 251 including an image input unit 2511, a correction parameter set up unit 2512, and a communication line output unit 2513; and a reception unit 252 including a communication line input unit 2521 connected with the communication line output unit 2513 through a communication line 253, a correction parameter interpretation unit 2522, a color correction unit 2523, and a character recognition/image processing unit 2524.

Here, the image read by the scanner is entered from the image input unit 2511 as the multi-valued color image data in three colors of RGB, for example. Then, the correction parameter set up unit 2512 attaches the attribution data to the input image, including such data as the type of the scanner, the serial number code, the input device name, ID, device type, the correction parameters required for the color printing shear correction, a flag indicating whether the color printing shear correction has already been carried out or not, and data for specifying the color printing shear correction process. Then, the input image is transmitted from the communication line out unit 2513 to the reception unit 252 having the character recognition function, through the communication line 253.

At the reception unit 252, when the image data are received at the communication line input unit 2521, the attribution data of the received image data are interpreted by the correction parameter interpretation unit 2522. Here, according to the scanner type and the serial number code given in the attribution data, the color printing shear correction parameters are interpreted by looking up the correspondence table between the color printing shear correction parameters and the scanner type and the serial number code which is registered in the system in advance. Here, if there is no correction parameter registered in the correspondence table, either the error processing is carried out, or the color printing shear correction parameters are acquired by using a process for obtaining the color printing shear correction parameters automatically.

In a case where the correction parameters are directly attached to the received image data, these correction parameters are going to be used. Here, if there is no attribution data which can specify the correction parameters in the received image data, either the error processing is carried out or the color printing shear correction parameters are acquired by using a process for obtaining the color printing shear correction parameters automatically.

Also, when the attribution data of the received image data includes a flag indicating that the color printing shear correction has already been carried out, the color printing shear correction is not going to be carried out at the reception unit 252. Otherwise, the color printing shear correction processing according to the obtained color printing shear correction parameters is carried out for the received image data at the color correction unit 2523.

The image data after the color printing shear correction obtained by the color correction unit 2523 are then sent to the character recognition/image processing unit 2524 to carry out the desired character recognition processing or the image processing.

In a case where the system includes the image storage device, the attribution data for specifying the color printing shear correction are stored in conjunction with the input image data, such that the stored data can be read out from the image storage device later on and used as the input image data for the system.

It is also possible to carry out color bias correction, or blurred color level equalization correction can also be carried out similarly, in addition to the color printing shear correction.

As described, according to the present invention, it is possible to provide an image processing system capable of facilitating the highly accurate character recognition on the colored input images, regardless of the slip color, writing color, printing method of the form portion or character portion in the slip, and the looseness of the requirement for the character writing.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An image processing system, comprising:

an image input unit for entering an input image data, corresponding to a plurality of image Portions of an input image, to be processed:

color separation unit, communicatively coupled to the image input unit, for determining a color separation of the input image data entered by the image input means to separately extract color images for different colors including every color present in the input image data, wherein geometrical data specifying geometrical characteristics of each image portion of the input image data obtained from the input image data and color data specifying colors of each image portion and a background of the input image data obtained from the input image data are utilized for separately extracting said color images for different colors; and an image data processing unit, communicatively coupled to the color separation unit, for processing the input image data according to the color separation determined by the color separation unit, wherein the input image data is accompanied by form data specifying a color separation scheme for each region of the input image data, and the color separation unit determines the color separation at each region of the input image data according to the color separation scheme specified by the form data.

2. An image processing system, comprising:

an image input unit for entering an input image data, corresponding to a plurality of image portions of an input image, to be processed;

a color separation unit, communicatively coupled to the image input unit, for determining a color separation of the input image data entered by the image input means to separately extract color images for different colors including every color present in the input image data, wherein geometrical data specifying geometrical characteristics of each image portion of the input image data obtained from the input image data and color data specifying colors of each image portion and a background of the input image data obtained from the input image data are utilized for separately extracting said color images for different colors; and an image data processing unit, communicatively coupled to the color separation unit, for processing the input image data according to the color separation determined by the color separation unit, wherein the input image data is accompanied by form data specifying a recognition scheme for each color in the input image data, and the input image data processing unit processes the input image data by applying the recognition scheme specified by the form data for each color separated by the color separation unit.

3. An image processing system, comprising:

an image input unit for entering an input image data, corresponding to a plurality of image portions of an input image, to be processed;

a color separation unit, communicatively coupled to the image input unit, for determining a color separation of the input image data entered by the image input means to separately extract color images for different colors including every color present in the input image data, wherein geometrical data specifying geometrical characteristics of each image portion of the input image data obtained from the input image data and color data specifying colors of each image portion and a background of the input image data obtained from the input image data are utilized for separately extracting said color images for different colors; and an image data processing unit, communicatively coupled to the color separation unit, for processing the input image data according to the color separation determined by the color separation unit, wherein the color separation unit determines the color separation for separating representative colors in the input image data, and the image data processing unit produces run length representations for the representative colors and a pointer table formed by pointers pointing to the run length representations, such that any of the representative colors can be looked up from the pointers of the pointer table.

4. An image processing system, comprising:

an image input unit for entering an input image data, corresponding to a plurality of image portions of an input image, to be processed;

a color separation unit, communicatively coupled to the image input unit, for determining a color separation of the input image data entered by the image input means to separately extract color images for different colors including every color present in the input image data, wherein geometrical data specifying geometrical characteristics of each image Portion of the input image data obtained from the input image data and color data specifying colors of each image portion and a background of the input image data obtained from the input image data are utilized for separately extracting said color images for different colors; and an image data processing unit, communicatively coupled to the color separation unit, for processing the input image data according to the color separation determined by the color separation unit, wherein the input image data is accompanied by attribution data indicating color correction parameters for the input image data, and the system further includes a reproducing unit for reproducing the color correction parameters from the attribution data accompanying the input image data and carrying out a color correction with respect to the input image data according to the reproduced color correction parameters.

5. An image processing system, comprising:

image input means for receiving an input image data to be processed, said input image data including at least one of a color image, a gray scale image, and a binary image;

a color image buffer connected to said image input means and configured to store and output a color image, if any, of said input image data;

a gray scale image buffer connected to said image input means and to said color image buffer, said gray scale image buffer configured to store and output a gray scale image, if any, of said input image data, based on said color image, if any, output from said color image buffer;

a binary image buffer connected to said image input means and to said gray scale image buffer, said binary image buffer configured to store and output a binary image, if any, of said input image data, based on said gray scale image, if any, output from said gray scale image buffer;

a first, second and third data recognition unit respectively connected to said color image buffer, said gray scale image buffer, and said binary image buffer, and configured to respectively perform independent image data processing on said color image, if any, said gray scale image, if any, and said binary image, if any; and a result correction unit connected to said first, second and third data recognition units and configured to determine a data recognition based on said independent image data processing performed by said first, second and third data recognition units.

6. A character recognition apparatus for recognizing characters on an input image data, comprising:

an input unit configured to receive the input image data;

a color separation unit connected to the input unit and configured to determine a plurality of separate regions on the input image data, the separate regions being determined based on a same color existing throughout all of the separate regions;

an image processing unit connected to the color separation unit and configured to perform image processing on the separate regions to obtain a combined region based on a proximity of a subset of the separate regions with respect to each other; and a character recognition unit connected to the image processing unit and configured to compare the combined region with a plurality of predetermined geometrical shapes representing known characters, wherein the subset of the separate regions are determined to correspond to one of the predetermined geometrical shapes that most closely matches the combined region with respect to a geometrical shape.

7. The system of claim 6, wherein the combined region further includes at least one other region proximately located to the separate regions having the same color, the at least one other region having a second color existing throughout the at least one other region, the second color being different from but similar to the same color.

8. A method of image processing, comprising the steps of:

entering an input image data to be processed;

storing binary image data obtained from the input image data along with at least one of color image data and gray scale image data given by the input image data; and processing the binary image data stored at the storing step, wherein said at least one of the color image data and the gray scale image data stored at the storing step are utilized to correct inaccuracies contained in the binary image data while processing the binary image data, wherein the storing step further comprises the substeps of:
extracting color image data from the input image data;
extracting gray scale image data from the input image data and the color image data;

extracting the binary image data from the input image data and the gray scale image data; and storing the binary image data in a binary image buffer, wherein the processing step further comprises the sub-steps of:

performing a first character recognition based on the color image data, and outputting first character recognition data as a result thereof;

performing a second character recognition based on the first character recognition data and the gray scale image data, and outputting second character recognition data as a result thereof;

performing a third character recognition based on the second character recognition data and the binary image data, and outputting third character recognition data as a result thereof; and performing result correction to output an image recognition result based on the first, second and third character recognition data.

* * * * *